(12) United States Patent
Edwards

(10) Patent No.: US 11,851,219 B2
(45) Date of Patent: Dec. 26, 2023

(54) MUSHROOM PACKAGING SYSTEM

(71) Applicants: Alan Edwards, Lisburn (GB); Sharon Edwards, Lisburn (GB)

(72) Inventor: Alan Edwards, Lisburn (GB)

(73) Assignee: Sharon Edwards, Lisburn (GB)

( * ) Notice: Subject to any disclaimer, the term of this patent is extended or adjusted under 35 U.S.C. 154(b) by 266 days.

(21) Appl. No.: 17/426,198

(22) PCT Filed: Jan. 31, 2020

(86) PCT No.: PCT/EP2020/000032
§ 371 (c)(1),
(2) Date: Jul. 28, 2021

(87) PCT Pub. No.: WO2020/156753
PCT Pub. Date: Aug. 6, 2020

(65) Prior Publication Data
US 2022/0119141 A1    Apr. 21, 2022

(30) Foreign Application Priority Data

Feb. 1, 2019 (GB) ...................... 1901444

(51) Int. Cl.
*B65B 25/02* (2006.01)
*B65B 59/00* (2006.01)
(Continued)

(52) U.S. Cl.
CPC .............. *B65B 25/02* (2013.01); *B65B 5/08* (2013.01); *B65B 5/105* (2013.01); *B65B 35/24* (2013.01);
(Continued)

(58) Field of Classification Search
CPC ....... B65B 25/02; B65B 59/001; B65B 35/24; B65B 59/04; B65B 65/003
See application file for complete search history.

(56) References Cited

U.S. PATENT DOCUMENTS

| 2004/0099467 A1* | 5/2004 | Doake | ............... G01G 15/00 180/400 |
| 2009/0026119 A1 | 1/2009 | Valka | |

(Continued)

FOREIGN PATENT DOCUMENTS

| EP | 1103466 A2 | 5/2011 |
| WO | 2012148278 A1 | 11/2012 |

(Continued)

OTHER PUBLICATIONS

International Search Report and Written Opinion dated Apr. 5, 2020 in corresponding PCT Application No. PCT/EP2020/000032.

*Primary Examiner* — Anna K Kinsaul
*Assistant Examiner* — Himchan Song
(74) *Attorney, Agent, or Firm* — Vitale Vickrey Niro & Gasey

(57) ABSTRACT

A mushroom packaging system 10 comprising a mushroom packaging apparatus 11 wherein empty containers 12 are at least partially filled with mushrooms 13. The system further comprises a mushroom loading apparatus 14 comprising a mushroom loading station 15 and a mushroom conveyor 16 for retaining and conveying mushrooms loaded thereon by an operator to the mushroom packaging apparatus 11. A container storage apparatus 50 is also provided which provides a container loading station 17 positioned such that an operator may load empty containers 12 thereinto. A container conveyance apparatus 22 conveys empty containers 12 from the container storage apparatus 50 to a packaged mushroom collection station 18 via the mushroom packaging apparatus 11. Packaged mushrooms 19 received at the packaged mushroom collection station 18 may be retrieved by the operator. A single operator may load mushrooms to the mushroom loading station 15, load containers to the container loading station 17, and retrieve containers from the packaged mushroom collection station 18.

19 Claims, 20 Drawing Sheets

(51) Int. Cl.
*B65B 5/08* (2006.01)
*B65B 5/10* (2006.01)
*B65B 35/24* (2006.01)
*B65B 35/38* (2006.01)
*B65B 43/44* (2006.01)
*B65B 57/14* (2006.01)
*B65B 59/04* (2006.01)
*B65B 65/00* (2006.01)

(52) U.S. Cl.
CPC .............. *B65B 35/38* (2013.01); *B65B 43/44* (2013.01); *B65B 57/14* (2013.01); *B65B 59/001* (2019.05); *B65B 59/04* (2013.01); *B65B 65/003* (2013.01)

(56) References Cited

U.S. PATENT DOCUMENTS

2011/0036061 A1\* 2/2011 De Vos ................ G01G 19/393
 53/502
2015/0353212 A1 12/2015 Williamson

FOREIGN PATENT DOCUMENTS

WO 2018002345 A1 1/2018
WO WO-2018002345 A1 \* 1/2018

\* cited by examiner

MUSHROOM PACKAGING SYSTEM

This patent application is a 35 U.S.C 371 national stage application of International Patent Application No. PCT/EP2020/000032, filed on Jan. 31, 2020, which claims priority to United Kingdom Application No. 1901444.8, filed on Feb. 1, 2019. All of these disclosures are hereby expressly incorporated by reference as part of the present disclosure as if fully set forth herein.

FIELD OF THE INVENTION

This invention relates to a mushroom packaging system.

BACKGROUND OF THE INVENTION

A substantial portion of the food commercially farmed and sold is packed in some form, typically in bags, containers or the like. The majority of such packaging, at least in relation to larger scale food production, is automated such that many of the steps are carried out by computer controlled machinery. However, in most packaging operations there is still a requirement for operator intervention in one or more steps in the packaging process. One example of such intervention is in relation to small items such as mushrooms, which are typically picked by hand from a growth bed by an operator before being input into a piece of machinery which carries out packaging steps in an at least semi-autonomous manner. In this case, an operator must typically also replenish the machinery with empty containers, and collect packaged mushrooms at an output of the machinery. Conventionally, the design and layout of such machinery results in the operator having to move around the machinery to different areas in order to input mushrooms, load empty containers, and collect packaged mushrooms. In some cases, multiple operators are required due to the disparity in the locations where these tasks are carried out, which increases cost. Where excess movement of an operator is required this reduces the overall efficiency of the operator, and increases safety concerns, particularly where the machinery may not be located at ground level. In addition, conventional machinery is large and cumbersome such that it is not easily transportable, or easily manipulated onsite to differing heights and locations should this be required.

It is desirable to provide a mushroom packaging system operable by a single operative and comprising a more compact overall form.

SUMMARY OF THE INVENTION

According to the invention there is provided a mushroom packaging system comprising: a mushroom packaging apparatus for packing mushrooms into containers; a mushroom loading apparatus comprising a mushroom loading station and a mushroom conveyor for conveying mushrooms to the mushroom packaging apparatus; a container conveyance apparatus for conveying containers from a container storage apparatus to a packaged mushroom collection station via the mushroom packaging apparatus; a container storage apparatus comprising a container loading station and being operable to deliver containers onto said container conveyance apparatus; and wherein the mushroom loading station, container loading station and packaged mushroom collection station are located sufficiently close to each other such that a human operator located at an operator station is able to load mushrooms to the mushroom loading station, load containers to the container loading station, and retrieve containers from the packaged mushroom collection station.

Advantageously, a single operator may load mushrooms into the system, replenish the supply of empty containers, and remove packaged mushrooms from the system with minimal movement, thus increasing both efficiency and safety.

Further advantageously, the requirement for additional operators located at different ends or sides of the system is negated.

Preferably, the operator station is positioned at a first end of the mushroom packaging system, the mushroom loading station, container loading station, and packaged mushroom collection station being positioned relative to the operator station such that they are accessible by an operator from the first end of the system.

Ideally, the mushroom conveyor and the container conveyance apparatus are configured such that mushrooms travel in a generally U-shaped path from the food loading station to the packaged mushroom collection station, and wherein the mushroom loading station and packaged mushroom collection station are preferably located adjacent each other and the operator station.

Ideally, the first end of the mushroom packaging system is a front end thereof.

Preferably. the mushroom loading station, container loading station and packaged mushroom collection station are located at a front end of the system.

Ideally, the operator station is located at said front end of the system.

Preferably, the mushroom loading station and the collection station are laterally spaced apart with respect to an end-to-end direction of the system.

Ideally, the operator station is provided between the mushroom loading station and the collection station.

Preferably, the mushroom loading station and the collection station are substantially in register with each other in the end-to-end direction.

Ideally, the operator station is substantially in register with the mushroom loading station and the collection station in the end-to-end direction.

Preferably, the container loading station is spaced apart from the mushroom loading station and the collection station in the end-to-end direction.

Ideally, the operator station is spaced apart from the mushroom loading station and the collection station in the end-to-end direction.

Preferably, the mushroom packaging apparatus is spaced apart from the mushroom loading station and the collection station in the end-to-end direction.

Ideally, the mushroom packaging apparatus is spaced apart from the operator station in the end-to-end direction.

Preferably, the container conveyor apparatus is arranged to convey containers in said end-to-end direction.

Ideally, the mushroom conveyor apparatus is arranged to convey mushrooms in said end-to-end direction Preferably, the container storage apparatus is located between the mushroom packaging apparatus and the mushroom loading station and the collection station.

Ideally, the container storage apparatus is located between the mushroom packaging apparatus and the operator station.

Preferably, the mushroom packaging apparatus is located between the container storage apparatus and the mushroom loading station and the collection station.

Ideally, the mushroom packaging apparatus is located between the container storage apparatus and the operator station.

Preferably, there is a conveyor apparatus for transferring containers from the container loading station to the container storage apparatus.

Preferably, the container conveyance apparatus is configured to selectably convey the containers in a first direction towards the mushroom packaging apparatus Ideally, the container conveyance apparatus is configured to selectably convey the containers in a second direction towards the packaged mushroom collection station.

Preferably, the first and second directions are opposite to each other.

Ideally, the container storage apparatus is located such that a container stored therein may be deposited therefrom onto the container conveyance apparatus at a location between the mushroom packaging apparatus and the packaged mushroom collection station.

Preferably, the container conveyance apparatus is arranged to convey an empty container deposited thereon in the first direction to the mushroom packaging apparatus, whereupon the empty container is at least partially filled, before moving the at least partially filled container in a second direction from the mushroom packaging apparatus to the packaged mushroom collection station.

Alternatively, the container storage apparatus comprises a container storage portion located such that a container may be deposited therefrom onto the container conveyance apparatus at a first side of the mushroom packaging apparatus located distal the side thereof closest the packaged mushroom collection station.

Ideally, where a container is deposited on the first side of the mushroom packaging apparatus, the container conveyance apparatus is arranged to convey an empty container deposited thereon through the mushroom packaging apparatus and towards the packaged mushroom collection station. Ideally, where the container storage portion is locatable such that an operative cannot directly place containers thereinto, a container transport device is provided to transport containers between the container loading station and the container storage portion.

Preferably, the container transport device is a conveyor, chute, slide, or any other such mechanism capable of carrying containers loaded at the container loading station to the container storage portion.

Ideally, the mushroom packaging system further comprises a mushroom processing apparatus located between the mushroom loading station and the mushroom packaging apparatus.

Preferably, the mushroom processing apparatus being configured to carry out a processing step on the mushrooms.

Ideally, the mushroom processing apparatus comprises a blade.

Preferably, the mushroom processing step is a cutting or trimming operation.

Preferably, the packaging apparatus comprises at least one mushroom lifting and/or lowering means which lifts the mushrooms from the mushroom conveyor and transfers the mushrooms to a container locatable on the container conveyance apparatus.

Ideally, the packaging apparatus comprises a slidable transfer carriage onto which the at least one mushroom lifting and/or lowering means is mounted.

Preferably, the at least one mushroom lifting and/or lowering means comprise at least one suction cup configured to engage with and selectably retain the mushrooms.

Ideally, the system is locatable adjacent a source of mushrooms from which an operator may pick or otherwise harvest mushrooms.

Preferably, the mushroom packaging system is mounted on a lifting apparatus such that the system may be for raising and lowering the system.

Advantageously, the system may be to aligned with sources of mushrooms located at differing heights.

Ideally, the lifting apparatus comprises a generally vertical frame.

Preferably, the system is slidably mountable to the frame.

Ideally, drive means are configured to drive slidable movement of the remainder of the system along the frame.

Preferably, the mushroom packaging apparatus comprises a weighing apparatus configured to weigh a container located at the mushroom packaging apparatus.

Ideally, the mushroom packaging apparatus further comprises a controller.

Preferably, the controller is in operable communication with the weighing apparatus such that container weight obtained from the weighing apparatus may be used by the controller to control the extent of filling of said container.

Ideally, the controller is in operable communication with any one or more of the mushroom conveyor, the mushroom packaging apparatus, the container storage apparatus, the container conveyance apparatus, the lifting and/or lowering means, the lifting apparatus, and/or with drive means or sub-components of these various components, as required, in order to control the operation of the system.

Ideally, the mushroom conveyor comprises mushroom holders which retain the mushrooms at an orientation wherein the heads thereof are facing upwards.

Ideally, the mushroom loading apparatus is removably attachable to the remainder of the mushroom packaging system via a loading apparatus coupling mechanism.

Ideally, the loading apparatus coupling mechanism is a quick release coupling mechanism.

Advantageously, a first mushroom loading apparatus sized and dimensioned to accommodate mushrooms of a first size may be quickly detached from the remainder of the mushroom packaging system and quickly replaced with an alternative mushroom loading apparatus sized and dimensioned to accommodate mushrooms of a size different from the first size. In this way an operator may quickly adapt a mushroom packaging system to package mushrooms of varying sizes.

Preferably, the container storage apparatus is removably attachable to the remainder of the mushroom packaging system via a container storage apparatus coupling mechanism.

Ideally, the container storage apparatus coupling mechanism is a quick release coupling mechanism.

Advantageously, a first container storage apparatus sized and dimensioned to accommodate containers of a first size and/or shape may be quickly detached from the remainder of the mushroom packaging system and quickly replaced with an alternative container storage apparatus sized and dimensioned to accommodate containers of different from the first size and/or shape. In this way an operator may quickly adapt a mushroom packaging system to package mushrooms into containers of varying sizes.

Preferably, the mushroom packaging apparatus comprises a mushroom lifting and/or lowering apparatus which comprises a plurality of the mushroom lifting and/or lowering means movably mountable on a base plate element such that individual lifting and/or lowering means may be selectably positionable relative to each other.

Ideally, the lifting and/or lowering means are slidably mountable within slots formed in the base plate element.

Advantageously, the mushroom lifting and/or lowering means are individually movable such that they may be arranged relative to each other to form an overall arrangement which is suited to a particular size of mushroom, or to a desired format for loading of containers.

Preferably, the base plate element comprises first and second portions joined about a pivotal coupling.

Advantageously, the second portion of the base plate element may be rotated when the lifting and/or lowering means mountable thereon are not required to form a desired arrangement of lifting and/or lowering means.

Ideally, the mushroom processing apparatus comprises first and second rotatable blades mountable on a common axis, the first blade being an upper blade and the second blade being a lower blade.

Preferably, least one of said first or second blades is movable along said common axis to increase or decrease the distance between the first and second blades.

Ideally, the upper and lower blades are positioned such that a mushroom head is locatable above the upper blade during the cutting process.

Advantageously, the stalk of a mushroom may cut at two selectable locations such that the upper portion of mushroom above the upper blade comprises a mushroom head and a pre-determined length of stalk, the portion of mushroom cut between the upper and lower blades comprises a length of stalk suitable for use as an ingredient for soup or the like, and the portion of stalk cut below the lower blade is a waste portion.

According to a second aspect of the invention there is provided a method of packaging mushrooms, the method comprising the steps of: loading mushrooms onto a mushroom conveyor at a mushroom loading station; loading empty containers into an empty container storage apparatus; transferring the loaded mushrooms and empty containers to a mushroom packaging apparatus; placing the mushrooms into the empty containers at the mushroom packaging apparatus forming items of packaged mushrooms; transferring the packaged mushroom items to a packaged mushroom collection station; and collecting packaged mushroom items from the package mushroom collection station, wherein the loading and collecting operations are carried out by an operator located at one operator station.

According to a third aspect of the invention there is provided a mushroom loading apparatus for use in a mushroom packaging system, the mushroom loading apparatus comprising a mushroom loading station and a mushroom conveyor for conveying mushrooms to a mushroom packaging apparatus, the mushroom loading apparatus being removably attachable to the remainder of the mushroom packaging system via a loading apparatus coupling mechanism.

Ideally, the loading apparatus coupling mechanism is a quick release coupling mechanism.

Advantageously, a first mushroom loading apparatus sized and dimensioned to accommodate mushrooms of a first size may be quickly detached from the remainder of the mushroom packaging system and quickly replaced with an alternative mushroom loading apparatus sized and dimensioned to accommodate mushrooms of a size different from the first size. In this way an operator may quickly adapt a mushroom packaging system to package mushrooms of varying sizes.

According to a fourth aspect of the invention there is provided a container storage apparatus for use in a mushroom packaging system, the container storage apparatus being configured for storing and conveying containers for use by the mushroom packaging system, the container storage apparatus being removably attachable to the remainder of the mushroom packaging system via a container storage apparatus coupling mechanism.

Ideally, the container storage apparatus coupling mechanism is a quick release coupling mechanism.

Advantageously, a first container storage apparatus sized and dimensioned to accommodate containers of a first size and/or shape may be quickly detached from the remainder of the mushroom packaging system and quickly replaced with an alternative container storage apparatus sized and dimensioned to accommodate containers of different from the first size and/or shape. In this way an operator may quickly adapt a mushroom packaging system to package mushrooms into containers of varying sizes.

According to a fifth aspect of the invention, there is provided a mushroom lifting and/or lowering apparatus comprising a plurality of mushroom lifting and/or lowering means which lift the mushrooms from a mushroom conveyor and transfer the mushrooms to a container, the mushroom lifting and/or lowering means being movably mountable on a base plate element such that individual lifting and/or lowering means may be selectably positionable relative to each other.

Ideally, the lifting and/or lowering means are slidably mountable within slots formed in the base plate element.

Advantageously, the mushroom lifting and/or lowering means are individually movable such that they may be arranged relative to each other to form an overall arrangement which is suited to a particular size of mushroom, or to a desired format for loading of containers.

Preferably, the base plate element comprises first and second portions joined about a pivotal coupling.

Advantageously, the second portion of the base plate element may be rotated when the lifting and/or lowering means mountable thereon are not required to form a desired arrangement of lifting and/or lowering means.

According to a sixth aspect of the invention there is provided a mushroom processing apparatus for use in a mushroom packaging system, the mushroom processing apparatus comprising first and second rotatable blades mountable on a common axis, the first blade being an upper blade and the second blade being a lower blade.

Preferably, at least one of said first and second blades is movable along said common axis to increase or decrease the distance between the blades.

Ideally, the upper and lower blades are positioned such that a mushroom head is locatable above the upper blade during the cutting process.

Advantageously, the stalk of a mushroom may cut at two selectable locations such that the upper portion of mushroom above the upper blade comprises a mushroom head and a pre-determined length of stalk, the portion of mushroom cut between the upper and lower blades comprises a length of stalk suitable for use as an ingredient in soup or the like, and the portion of stalk cut below the lower blade is a waste portion.

It will be understood that the packaging system and method disclosed herein may be used to package any other suitable items, particularly but not exclusively other food items such as other vegetables or fruits.

BRIEF DESCRIPTION OF THE DRAWINGS

Embodiments of the invention is now described by way of example and with reference to the accompanying drawings in which like numerals are used to denote like parts and in which.

DETAILED DESCRIPTION OF THE DRAWINGS

Figure 1:
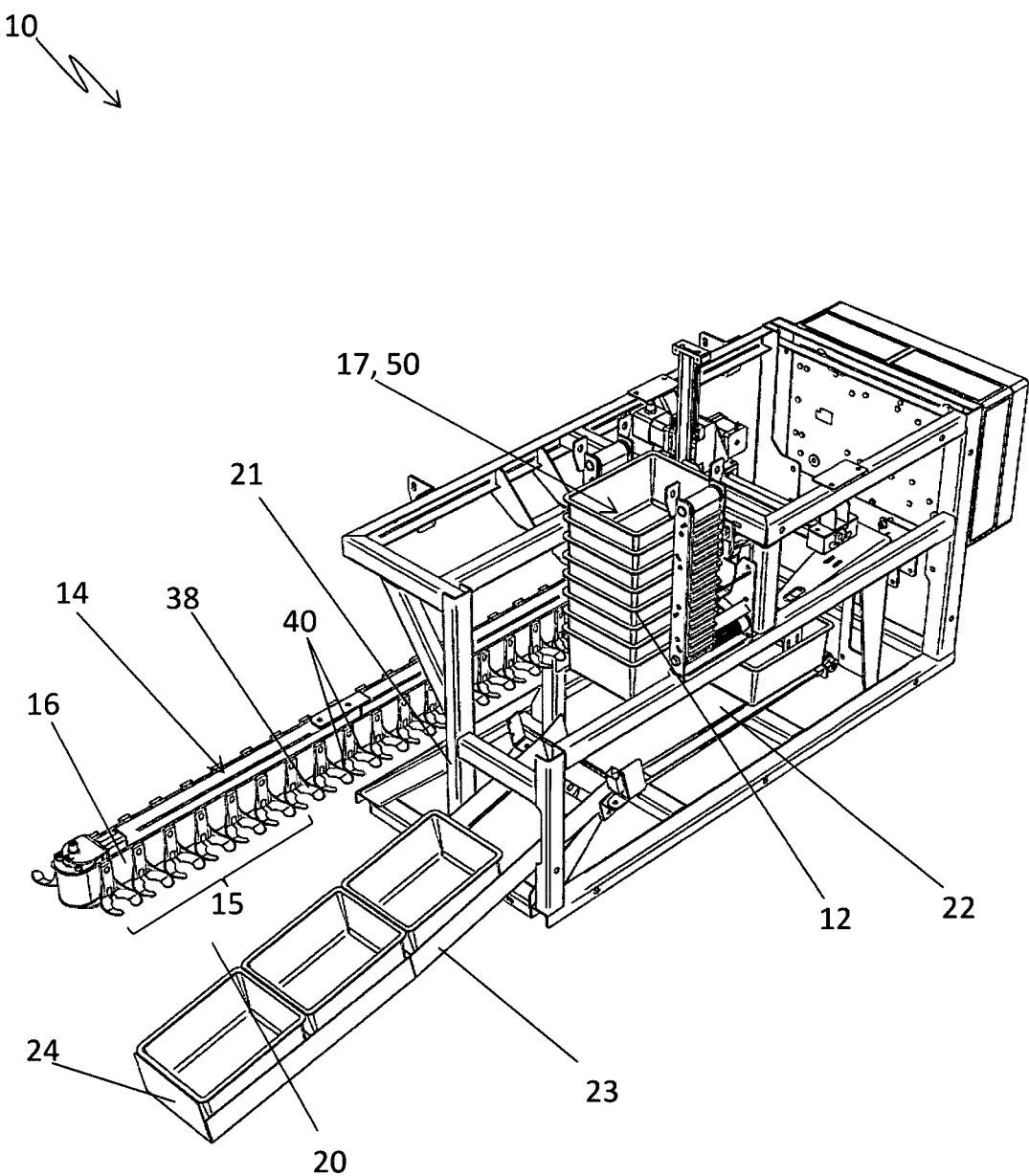
FIG. 1 is a perspective front view of a mushroom packaging system embodying the invention, showing a first longitudinal side of the system.
Figure 2:
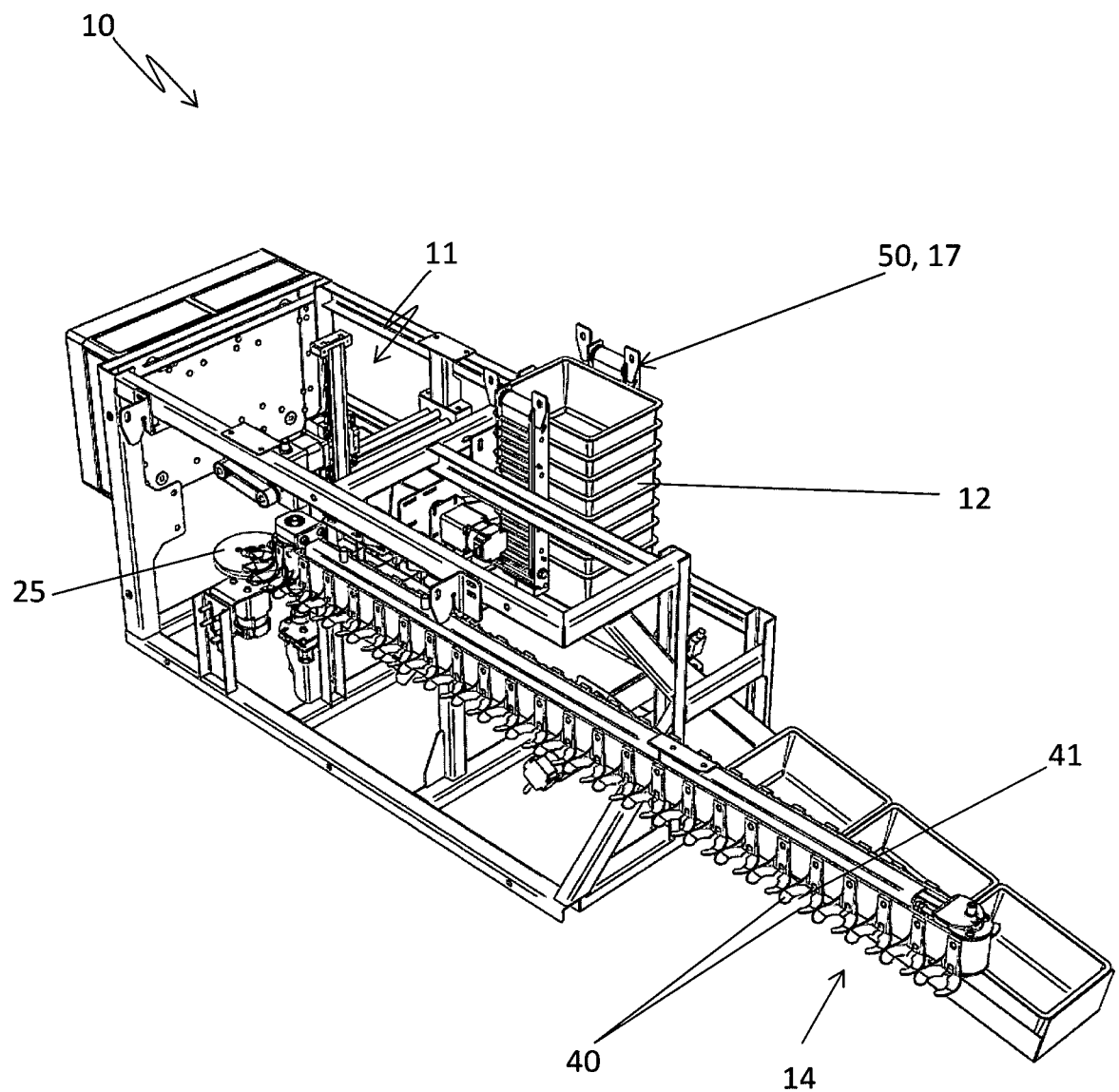
FIG. 2 is a perspective front view of the mushroom packaging system showing a second longitudinal side of the system.
Figure 3:
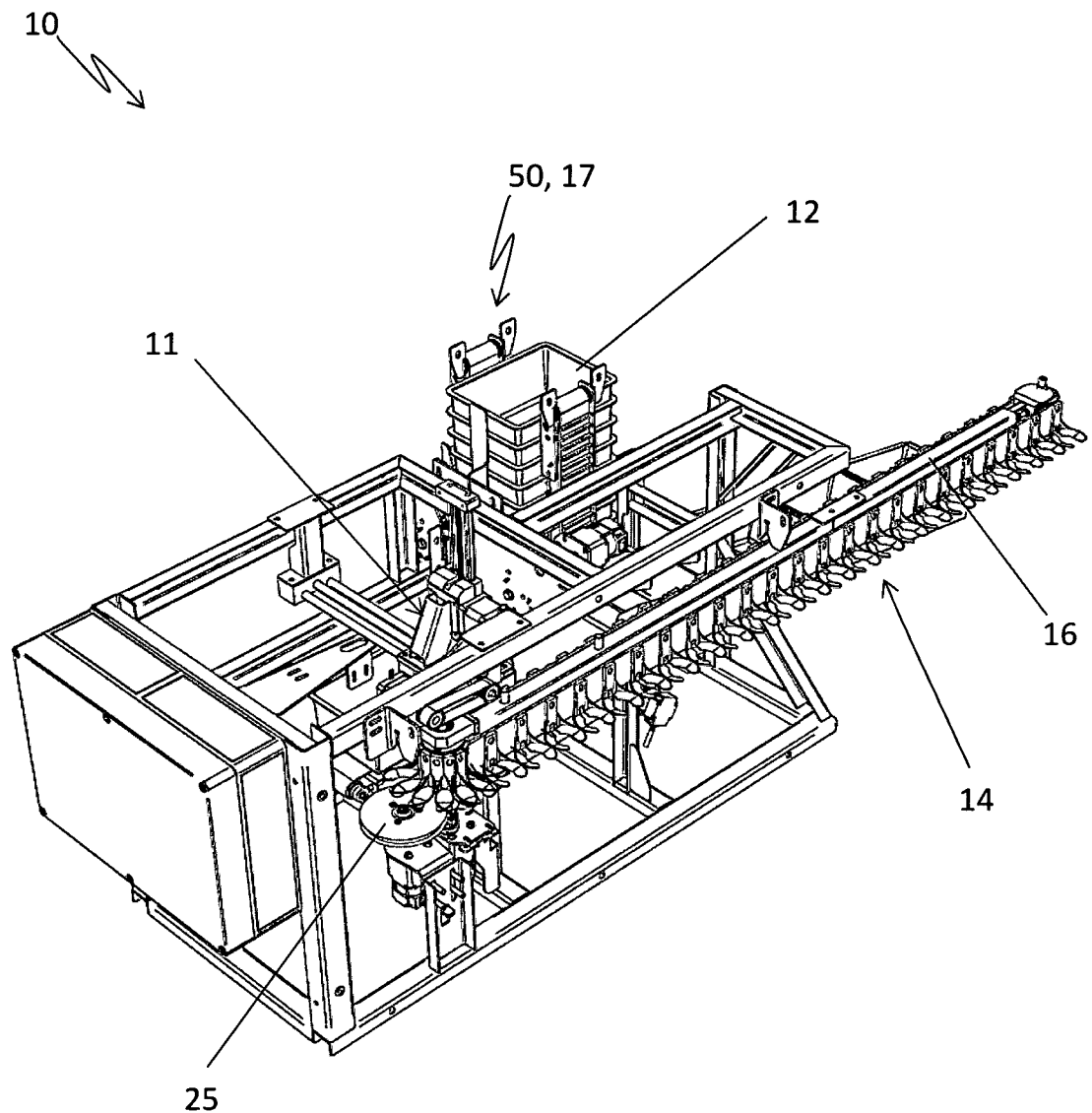
FIG. 3 is a rear perspective view of the mushroom packaging system showing a second longitudinal side of the system.
Figure 4:
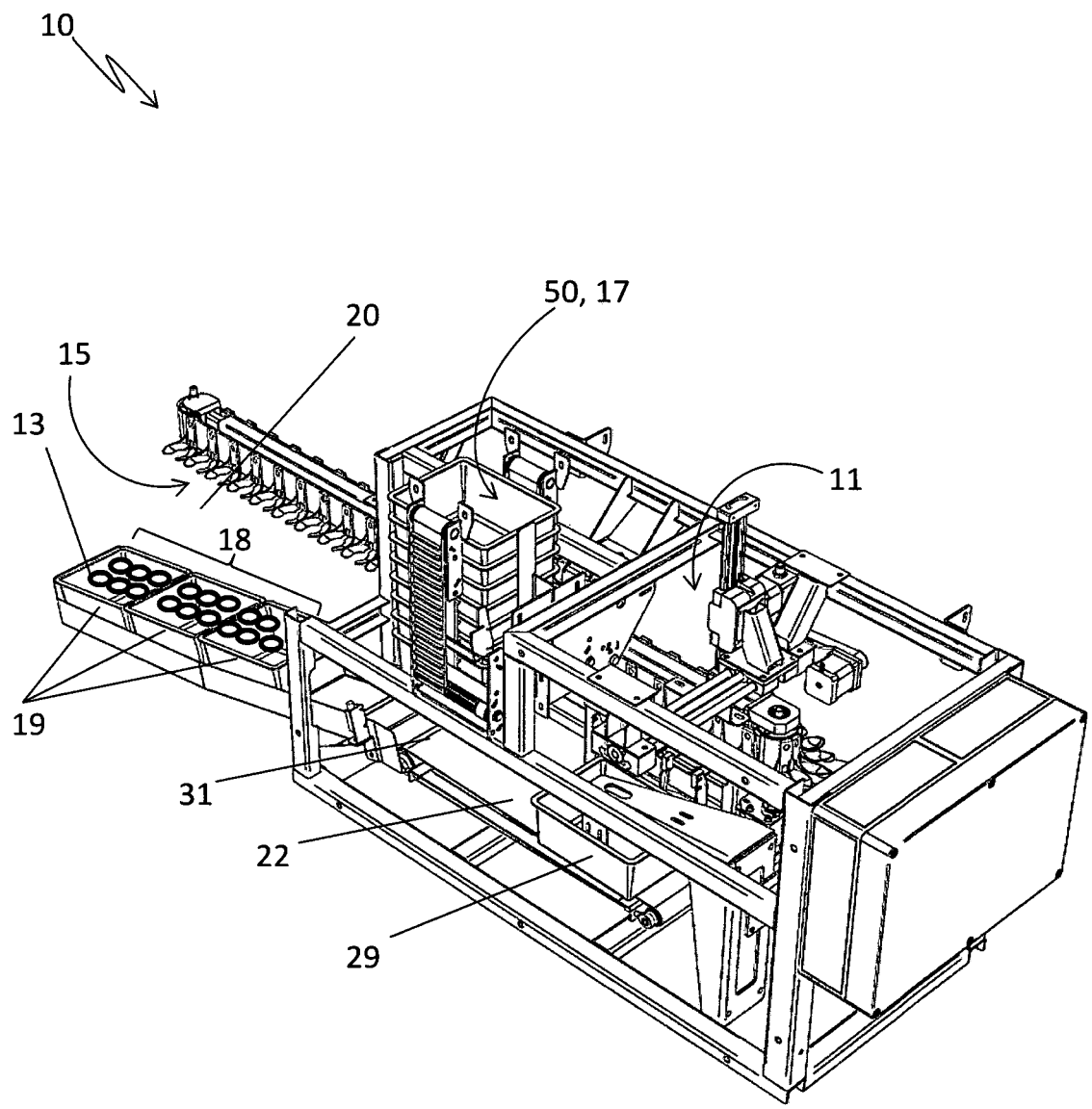
FIG. 4 is a rear perspective view of the mushroom packaging system showing a first longitudinal side of the system.
Figure 5:
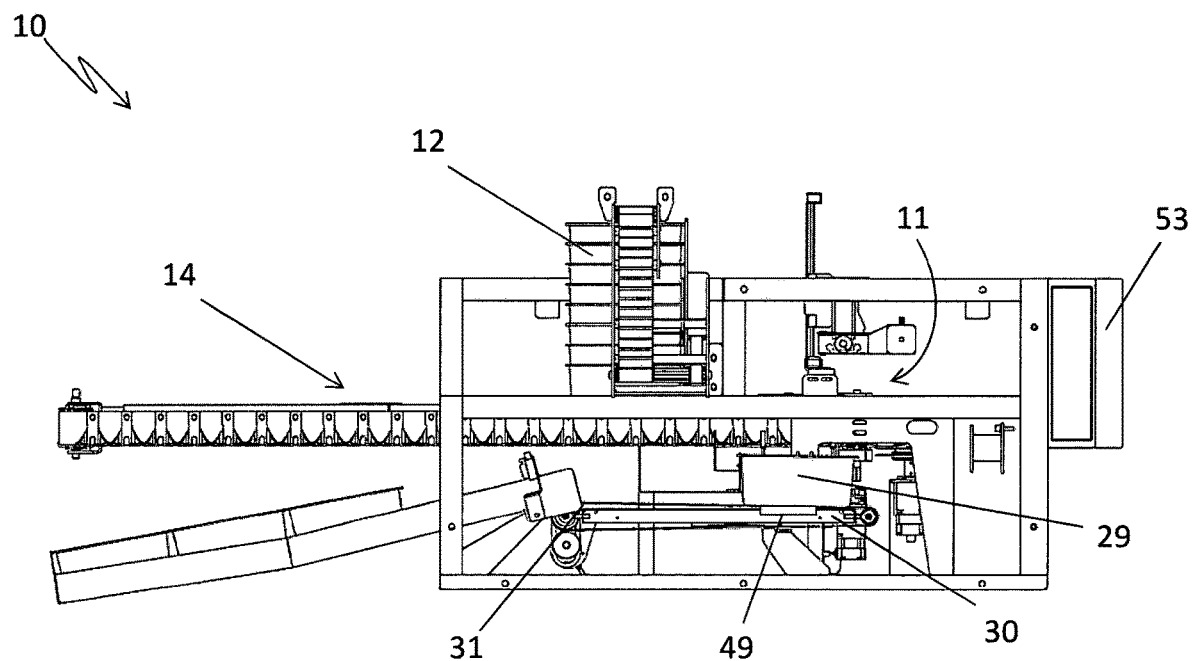
FIG. 5 is a side view of the mushroom packaging system showing a first longitudinal side of the system.
Figure 6:
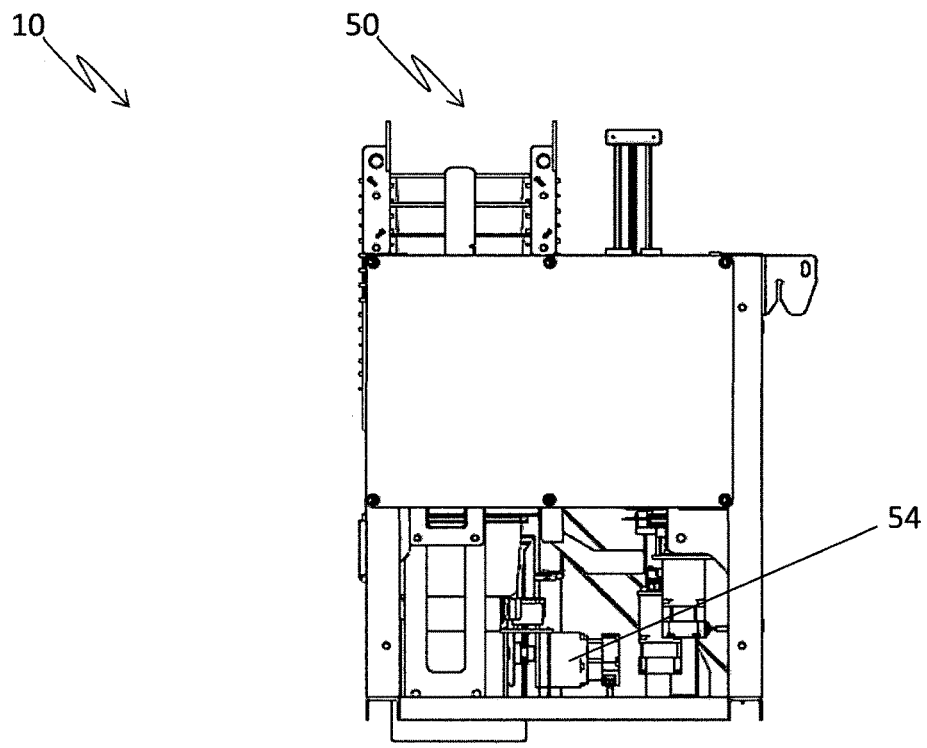
FIG. 6 is a rear view of the mushroom packaging system.
Figure 7:
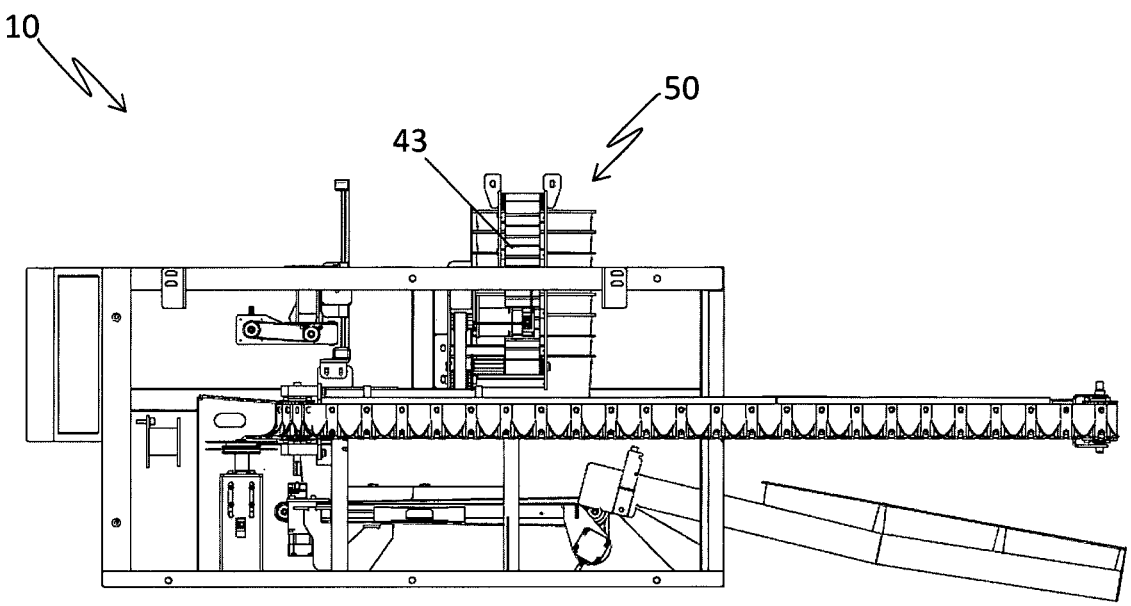
FIG. 7 is a side view the mushroom packaging system showing a second longitudinal side of the system.

The present teaching will now be described with reference to an exemplary mushroom packaging system. It will be understood that the exemplary mushroom packaging systems are provided to assist in an understanding of the present teaching and are not to be construed as limiting in any fashion. Furthermore, elements or components that are described with reference to any one Figure may be interchanged with those of other Figures or other equivalent elements without departing from the spirit of the present teaching.

Referring now to the Figures there is illustrated a mushroom packaging system 10 comprising a mushroom packaging apparatus 11 wherein empty containers 12 are at least partially filled with mushrooms 13. In the embodiment of the drawings, the system further comprises a mushroom loading apparatus 14 comprising a mushroom loading station 15 and a mushroom conveyor 16 for retaining and conveying mushrooms loaded thereon by an operator (not shown) to the mushroom packaging apparatus 11. A container storage apparatus 50 is also provided which provides a container loading station 17 positioned such that an operator may load empty containers 12 thereinto. In a preferred embodiment the empty containers 12 are provided in a stack, with further containers 12 being loaded into the top of the stack as required to replenish the supply of containers 12. A container conveyance apparatus 22 conveys empty containers 12 from the container storage apparatus 50 to a packaged mushroom collection station 18 via the mushroom packaging apparatus 11. Packaged mushrooms 19 (i.e. containers 12 packed with mushrooms 13) received at the packaged mushroom collection station 18 may be retrieved by the operator. In a preferred embodiment, a single operator is located at an operator station 20 from which the operator has access to the mushroom loading station 15, container loading station 17, and packaged mushroom collection station 18. Advantageously, a single operator may load mushrooms 13 into the mushroom loading station 15, replenish the supply of empty containers 12, and remove packaged mushrooms 19 from the system with minimal movement. Further advantageously, the requirement for additional operators located at different ends or sides of the system is negated.

In preferred embodiments, the operator station 20 is located at a first end 21 of the mushroom packaging system 10 and comprises an area in which an operator may stand to load mushrooms 13 and empty containers 12 into the system, and collect packaged mushrooms 19 from the system, all without leaving the operator station 20. The mushroom loading station 15, container loading station 17, and packaged mushroom collection station 18 are positioned relative to the operator station 20 such that they are accessible by an operator whilst located at the first end 21 of the system. In use, and in the preferred embodiment, the system 10 is configured such that mushrooms travel in a generally U-shaped path from the mushroom loading station 15 to the packaged mushroom collection station 18 such that the mushroom loading station 15 and packaged mushroom collection station 18 are located proximal to each other at the same end 21 of the system 10, and proximal to the operator station 20. In preferred embodiments, the operator station 20 is located between the loading station 15 and the collection station 18, i.e. the loading station 15 and collection station 18 are located laterally of the operator station 20. Conveniently, the container loading station 17 is located forwardly of the operator station 20, i.e. such that the loading station 17 is located in front of the operator when he is located in the operator station 20 facing the system 10. Preferably, the mushroom loading station 15, container loading station 17, and packaged mushroom collection station 18 are positioned relative to the operator station 20 such that an adult operator of regular size and ability may simply stand in position but still easily access any of the mushroom loading station 15, container loading station 17, and packaged mushroom collection station 18. In use, the system 10 is located beside a supply of mushrooms, typically a growth bed (not shown), such that the operator can reach the mushroom growth bed from the operator station 20 from which he may pick mushrooms 13 for loading into the system 10. An additional advantage is that an operator may pick mushrooms 13 with both hands improving the accuracy and speed of picking.

In the embodiment of FIGS. 1 to 11, the container conveyance apparatus 22 is configured to selectably convey the containers both in a first direction towards the mushroom packaging apparatus 11, and in a second direction towards the packaged mushroom collection station 18. In a preferred embodiment, the first and second directions are opposite to each other and the container conveyance apparatus 22 is a belt conveyor, although other types of conveyor may alternatively be used. The conveyor 22 is capable of movement in both a forward and a reverse direction and extending such that a container thereon may be placed at the mushroom packaging apparatus 11 at a first end 30 of the conveyor 22, at the packaged mushroom collection station 18 at a second end 31 of the conveyor 22, or at a location therebetween. The conveyor 22 may be of any suitable kind known to a person skilled in the art and may be driven by a motor 54 or any other such suitable drive means capable of driving in two directions. Alternatively, the conveyor 22 may be driven by two motors configured to selectably drive the conveyor belt in opposing directions, or a motor which drives in a single direction may be in operable engagement with the conveyor 22 via a geared arrangement which can be selectably engaged to reverse the direction which the conveyor 22 moves under the influence of the motor. It should be understood that any conveyance arrangement may be employed that is suitable for moving the containers in the described manner. The packaged mushroom collection station 18 may also be provided with a slide 23 which encourages sliding of packaged mushrooms 19 towards an end 24 of the packaged mushroom collection station 18. It should be understood that, in some embodiments, additional packaging steps may also be incorporated into the system. For example, the containers may be covered with cellophane or another such covering at some point along the conveyor 22.

Figure 8:
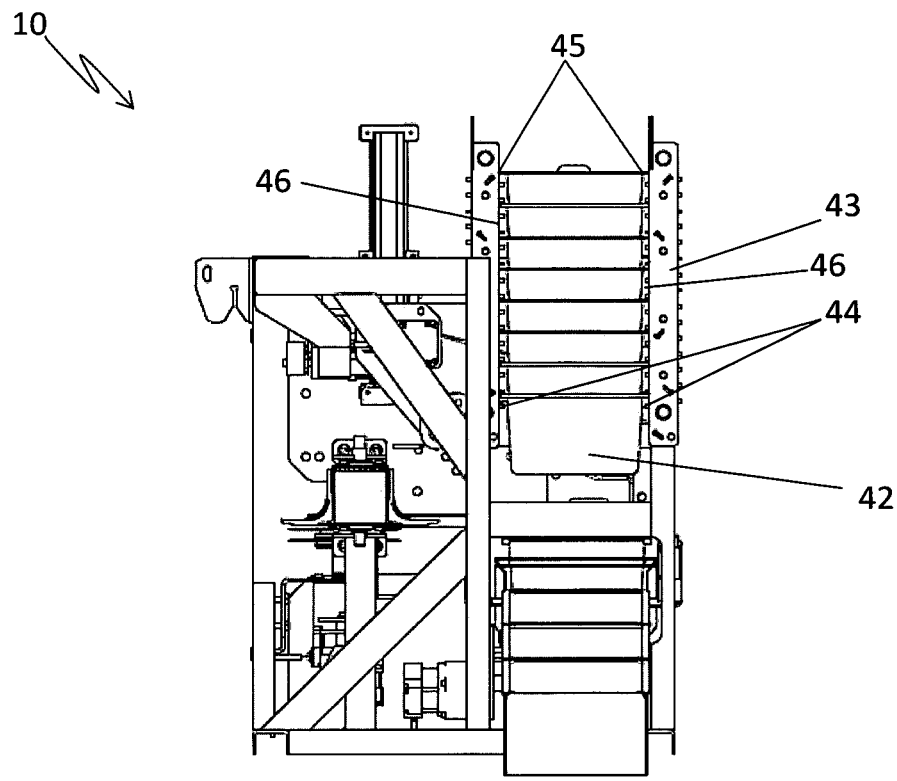
FIG. 8 is a front view of the mushroom packaging system.

The container storage apparatus comprises a container storage portion 55. However, in the embodiment of FIGS. 1 to 11, the container storage portion 55 and container loading station 17 are essentially the same component as the location of the container storage portion 55 is such that containers may be directly loaded thereinto by an operator. Further embodiments will be later discussed wherein the container loading station 17 and container storage portion 55 are separate components and containers 12 must travel to the container storage portion 55 from the container loading station 17 as the two components 17, 55 may not be co-located. The container storage apparatus 50 is located such that an empty container stored therein 12 may be deposited therefrom onto the conveyor 22 at a location between the mushroom packaging apparatus 11 and the packaged mushroom collection station 18. The container storage apparatus 50 is operable to deliver containers, preferably one at a time, onto the conveyor 22, and may comprise any conventional delivery, or release, mechanism for this purpose. For example, the container storage apparatus 50 may have a release mechanism which engages with the bottom most container 42 and is movable to selectably release said bottom most container 42. In the preferred embodiment, and as best seen in FIG. 8, the release mechanism comprises opposing continuous tracks 43 located on either side of the container storage apparatus 50, the continuous tracks 43 having lip engagement elements 44 which are shaped and sized to engage with the underside of a lip 45 of the containers 12 on each side of the containers 12. The continuous tracks 43 rotate such that the lip engagement elements 44 travel downwards when on an inner facing portion 46 of the continuous tracks 43, which causes the bottom most lip engagement element of each continuous track to disengage from the lip of the bottom most container 42 such that the container is allowed to drop onto the conveyor 22. The continuous tracks 43 of the release mechanism may be driven by a motor or any other such suitable drive means. As can be viewed in FIG. 25, the release mechanism of the container storage apparatus 50 may also comprise a screw type mechanism which engages with the lip 45 of the containers 12 such that rotation of the screw mechanism effects travel of a container 12 along said screw mechanism. When the lip 45 of the container 12 has reached a lower end of the screw mechanism, the container 12 is released onto the conveyor 22. The conveyor belt 22 conveys an empty container 12 deposited thereon in the first direction to the mushroom packaging apparatus 11, wherein the empty container 12 is at least partially filled with mushrooms. The direction of the conveyor belt is then reversed such that the packaged mushrooms 19 are moved in the second direction from the mushroom packaging apparatus 11 to the packaged mushroom collection station 18. In alternative embodiments, the conveyor belt may be so routed that the conveyor belt is driven in a single direction and transports the containers to the rear of the packaging apparatus 11 after which they travel through the packaging apparatus 11 and on to the packaged mushroom collection station 18. The rear of the mushroom packaging apparatus 11 being the end thereof distal the packaged mushroom collection station 18.

In a preferred embodiment, the mushroom packaging system 10 further comprises a mushroom processing apparatus 25 locatable between the mushroom loading station 15 and the mushroom packaging apparatus 11, the mushroom processing apparatus 25 carrying out at least one processing step on the mushrooms. In the embodiment shown in the drawings, the mushroom processing apparatus 25 comprises a blade such that a cutting or trimming operation is carried out on the stalk 26 of the mushroom 13. Some embodiments may include further or alternative processing steps carried out between the mushroom loading station 15 and the mushroom packaging apparatus 11. For example, the mushrooms may be washed or inspected, and suitable apparatus may be provided for such purpose.

The packaging apparatus 11 comprises a lifting device, typically comprising a plurality of lifting and lowering members 28, for lifting the mushrooms from the mushroom conveyor 16 and transferring the mushrooms 13 to a container 29 located on the conveyor 22 at a loading location, which is at the end 30 of the conveyor 22 in the illustrated embodiment. In a preferred embodiment, there are three lifting and lowering members 28 arranged in a linear relationship, each capable of lifting a single mushroom 13 such that a row of three mushrooms 13 are lifted thereby and transferred to, preferably lowered into the container 29. The row of three mushrooms 13 is chosen as this aligns with the dimensions of the typical punnet sized container used in the embodiment shown. However it should be understood that a greater or fewer number of lifting and lowering members 28 may be provided to suit differing mushroom and/or container sizes. The mushroom conveyor 16 may be stopped or slowed such that the lifting device 28 has sufficient time to lift the mushrooms 13 therefrom. In alternative embodiments, the lifting and lowering members are lifting members only, in which case they simply drop the mushrooms into the container 29 rather than lowering.

Figure 9:
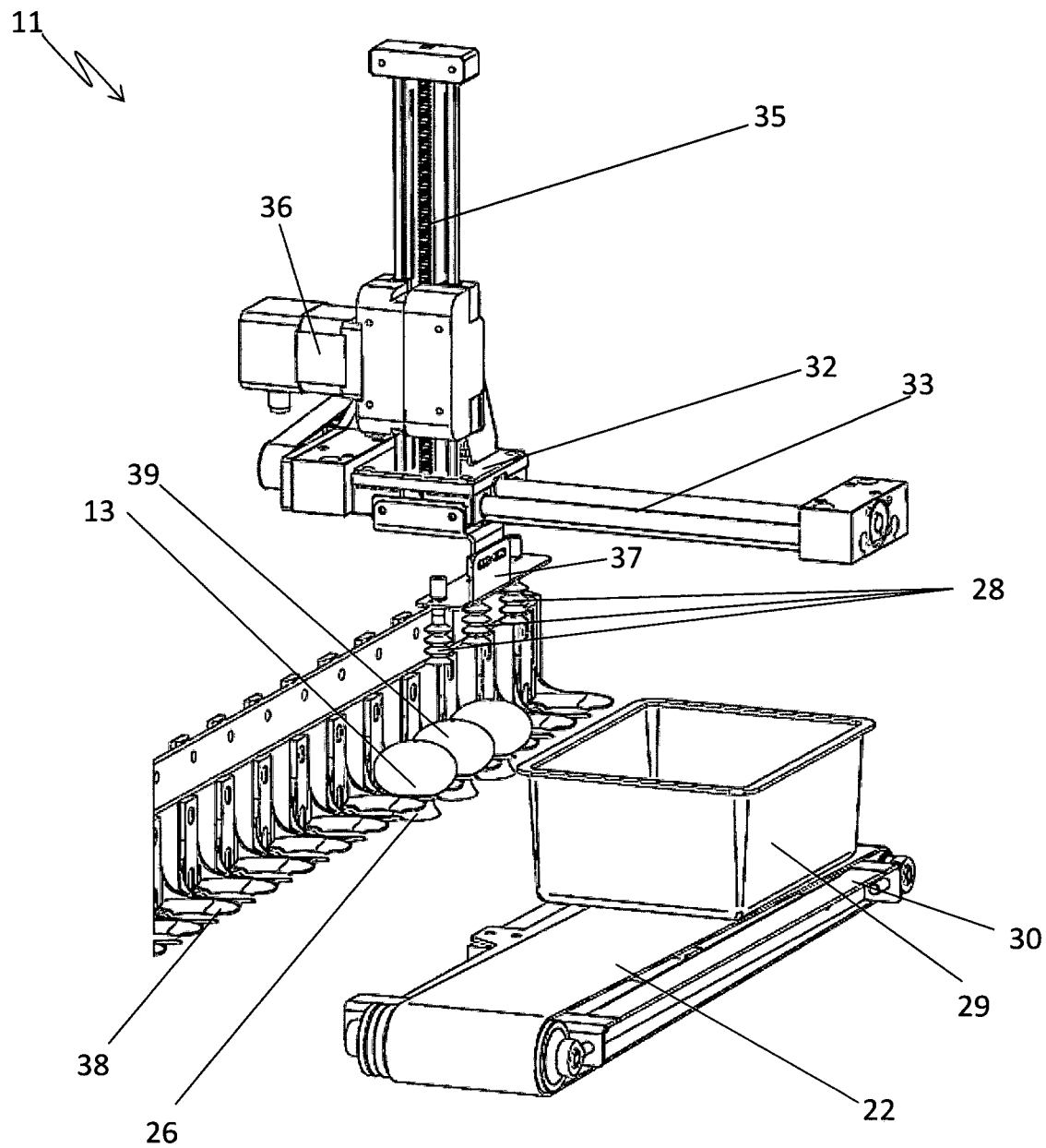
FIG. 9 is a perspective view of a packaging apparatus of the mushroom packaging system.
Figure 10:
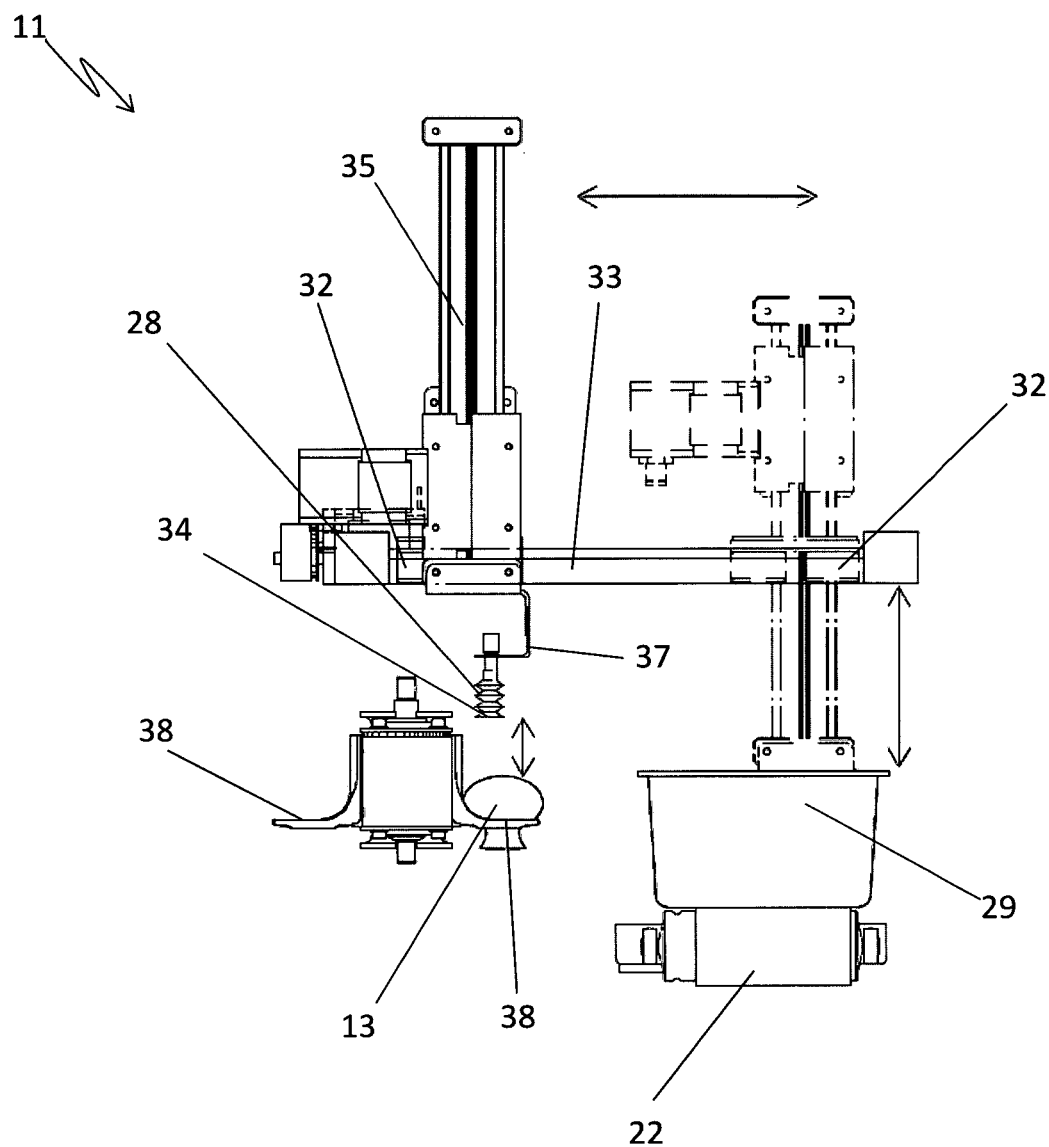
FIG. 10 is a front view of the packaging apparatus of FIG. 9, showing a slidable transfer carriage thereof in a plurality of positions.

The packaging apparatus 11 comprises means for moving the lifting device 28 between a first position in which it is capable of lifting mushrooms from the mushroom conveyor 16 (conveniently from a part of the conveyor 16 that is adjacent the loading location 30 of the conveyor 22), and a second position in which it is capable of depositing mushrooms into the container 29 that is in the loading location 30 of the conveyor 22. In a preferred embodiment, and as best illustrated in FIGS. 9 and 10, the moving means comprises a movable transfer carriage 32 mounted, e.g. slidably, on a carriage arm 33 and being movable along the arm 33. The lifting device 28 may be mounted on the carriage in any convenient manner.

In a preferred embodiment as shown in FIG. 10, the carriage arm 33 is itself movable such that it may be raised and lowered which in turn raises and lowers the lifting device 28. This may be achieved by any conventional means. In the illustrated embodiment, the carriage arm 33 is slidably coupled to a vertical track 35 by any suitable drive mechanism, and a motor 36 is operable to move the carriage arm 33 along the track 45 via the drive mechanism. The lifting and lowering members 28 are mounted to the slidable transfer carriage 32 via a bracket 37.

In preferred embodiments, the lifting device 28 is vacuum operated. To this end, the lifting and lowering members 28 may each comprise a suction cup 34 configured to engage with and selectably retain a mushroom 13 by the application of a suction force. The suction force may be supplied by a vacuum pump (not shown) or the like in connected to the suction cups by any convenient means, typically pipes (not shown). Preferably, the suction force at each suction cup 34 may be independently activated and deactivated with respect to the other suction cups 34. In this manner, the system may dictate that any number of the available suction cups 34 are activated such that they engage with and selectably retain a mushroom 13. The suction force is calibrated such that the delicate surface of a mushroom 13 is not damaged thereby. The material of the suction cup 34 may also be elastically deformable in nature such that damage to the mushroom 13 is further avoided. It should be understood that any suitable structure known to the skilled person for lifting mushrooms from a conveyor and placing the mushrooms in a container may be utilised.

In a preferable embodiment, the mushroom packaging apparatus 11 comprises a weighing device 49 configured to weigh the container 29 located at the mushroom packaging apparatus 11. Preferably, the weighing device comprises a scale 49 incorporated into or locatable under the conveyor 22, conveniently at the loading location 30. Preferably, the mushroom packaging system 10 further comprises a controller 53 in operable communication with the scale 49 and the mushroom packaging apparatus 11 such that a weight for a container 29 obtained from the scale 49 may be used to control the filling of said container. For example, wherein the mushroom loading apparatus 11 is configured to place three mushrooms 13 at a time into the container 29, but the container 29 has a weight determined by the scale such that addition of another three mushrooms 13 to the container 29 would place the container above a maximum weight, the controller 53 may instruct the mushroom packaging apparatus 11 to only load one or two mushrooms 13 into the container 29. In this case, one or more of the suction cups 34 are deactivated by the controller 53 such that no suction force is applied and thus no mushroom 13 is lifted thereby. The controller 53 may also calculate the number of mushrooms 13 required to exceed a minimum desired weight and fill the container 29 until the desired weight is achieved. The controller may for example comprise a suitably programmed PLC controller, and/or computer(s). Typically, the controller 53 comprises a central computer programmed to co-ordinate the operation of the various components of the system 10, and being in communication with one or more other computers or processors that control respective system components.

In the preferred embodiment, the mushroom conveyor 16 comprises mushroom holders 38 which each retain a single mushroom 13 at an orientation wherein the heads 39 thereof are facing upwards. The mushroom holders comprise two mushroom head support members 40 defining an aperture 41 therebetween into which the stalk 26 of a mushroom 13 may be located. The operator places the mushrooms 13 into the mushroom holders at the mushroom loading station 15 such that the stalks 26 extend downwards through the aperture 41 and the heads 39 are facing upwards. The mushroom conveyor 16 preferably comprises a continuous track which extends from the mushroom loading station 15 to adjacent the mushroom packaging apparatus 11 and back again to the mushroom loading station 15. The mushroom conveyor 16 may therefore move in only one direction whist transporting mushrooms 13 loaded thereon to the mushroom packaging apparatus 11 and returning empty mushroom holders to the mushroom loading station 15 once the mushrooms have been removed therefrom at the mushroom packaging apparatus 11. The mushroom conveyor 16 may be driven by any suitable motor or other such drive means known to a person skilled in the art. Advantageously, as the mushrooms 13 are delivered to the mushroom packaging apparatus 11 in an orientation such that the heads thereof are facing upwards, the suction cups engage with the mushrooms 13 more effectively due to said engagement being with the head 39 portion of the mushroom, which has a more suitable shape and surface for engagement with the suction cups 34. Additionally, the mushrooms 13 are loaded into the container in their heads up orientation which forms a more aesthetically pleasing presentation of the final packaged mushrooms 19, this orientation being favoured by consumers/end purchasers of mushrooms.

Figure 11:
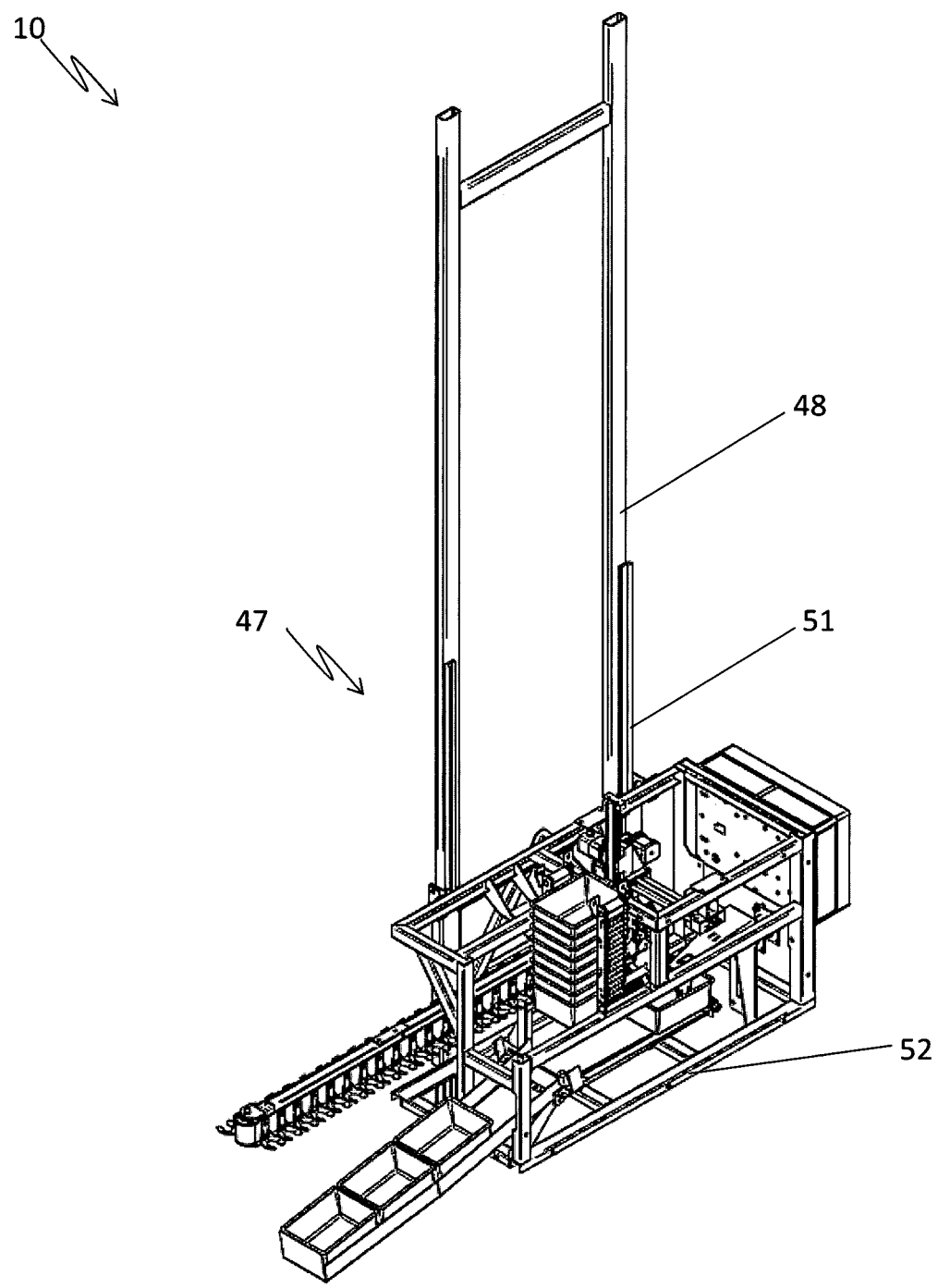
FIG. 11 is a front perspective view of a mushroom packaging system, showing a lifting apparatus thereof.
Figure 12:
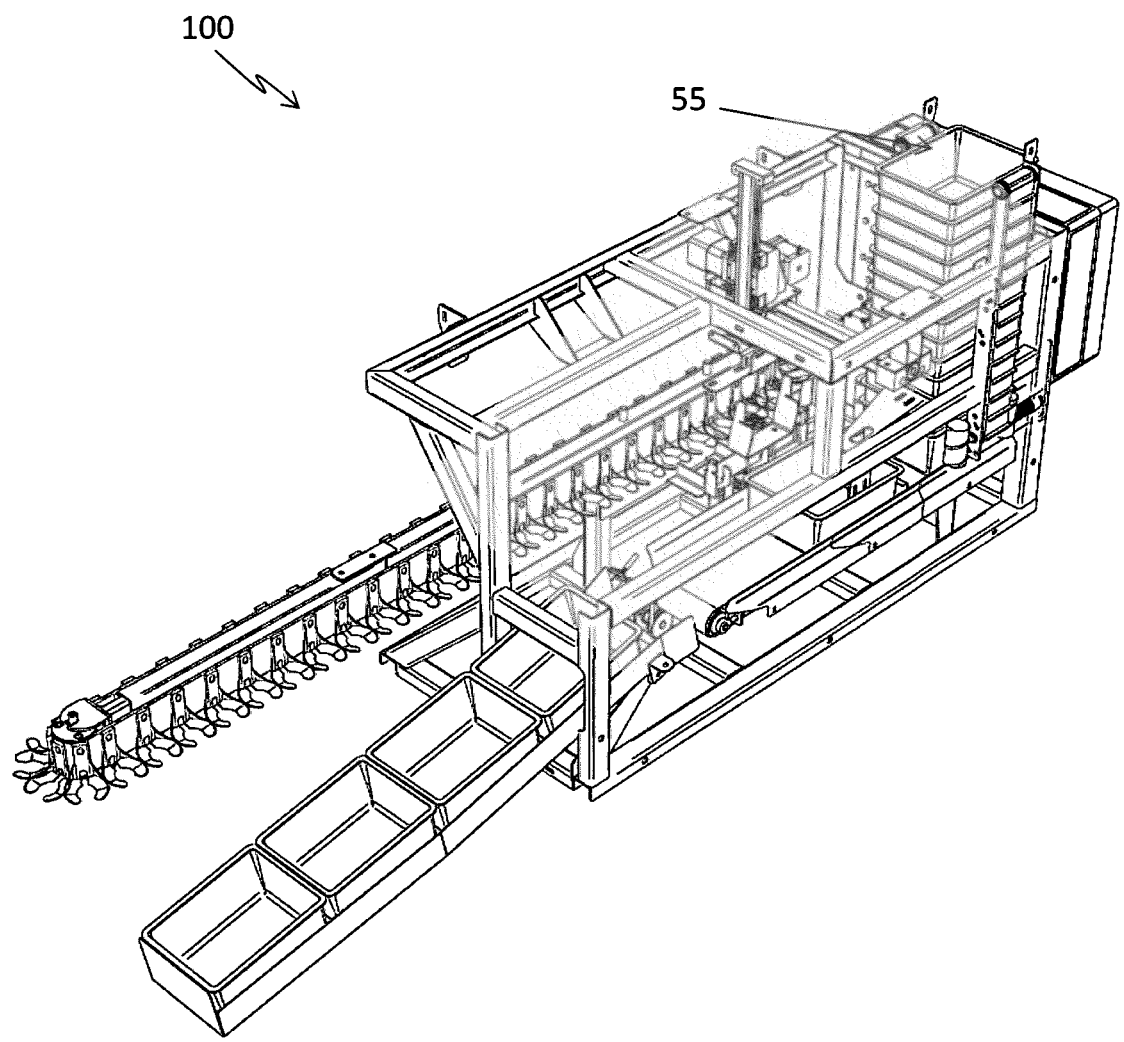
FIG. 12 is a perspective front view of second embodiment of a mushroom packaging system showing a first longitudinal side of the system.
Figure 13:
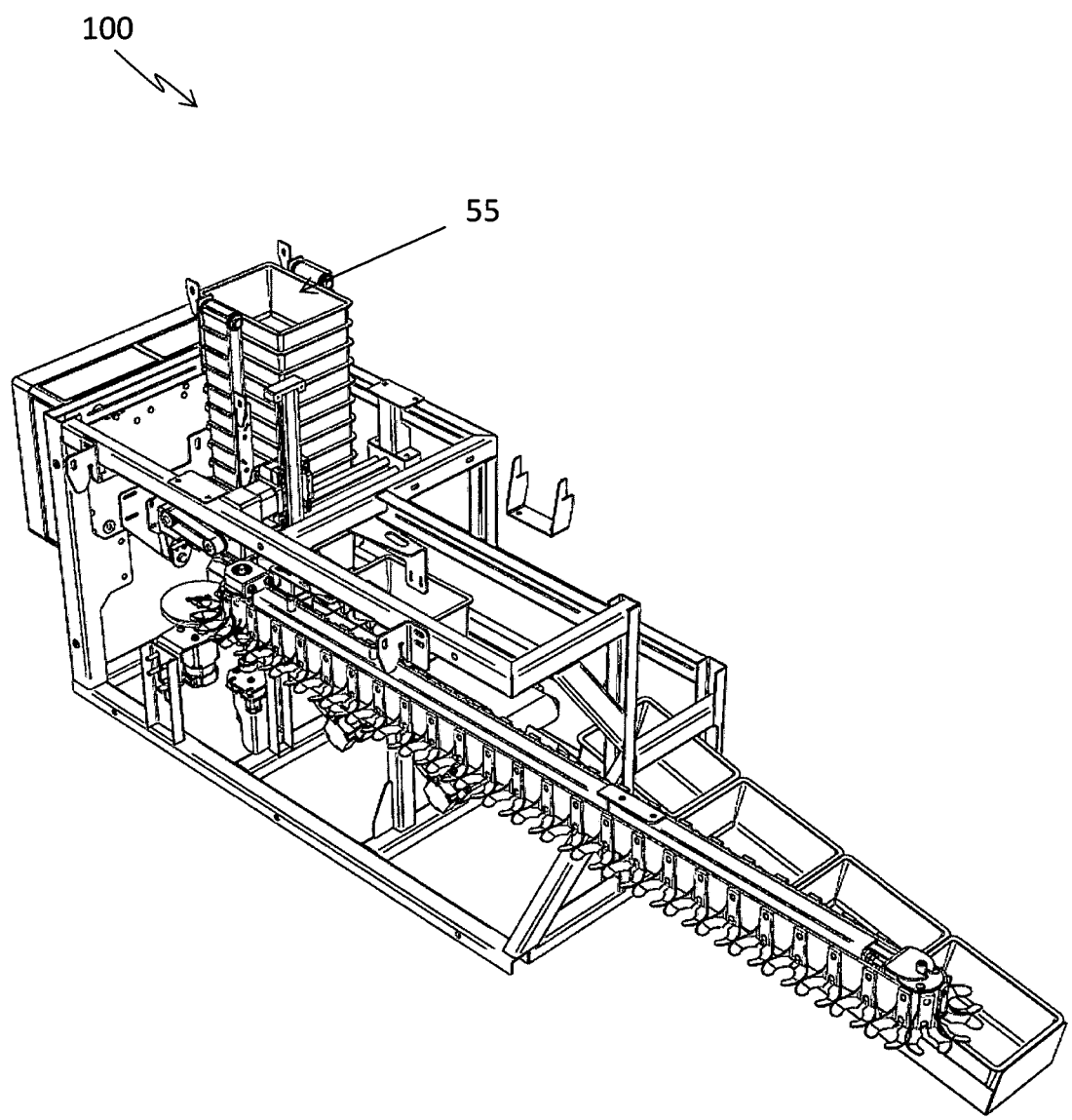
FIG. 13 is a perspective front view of the mushroom packaging system of FIG. 12 showing a second longitudinal side of the system.
Figure 14:
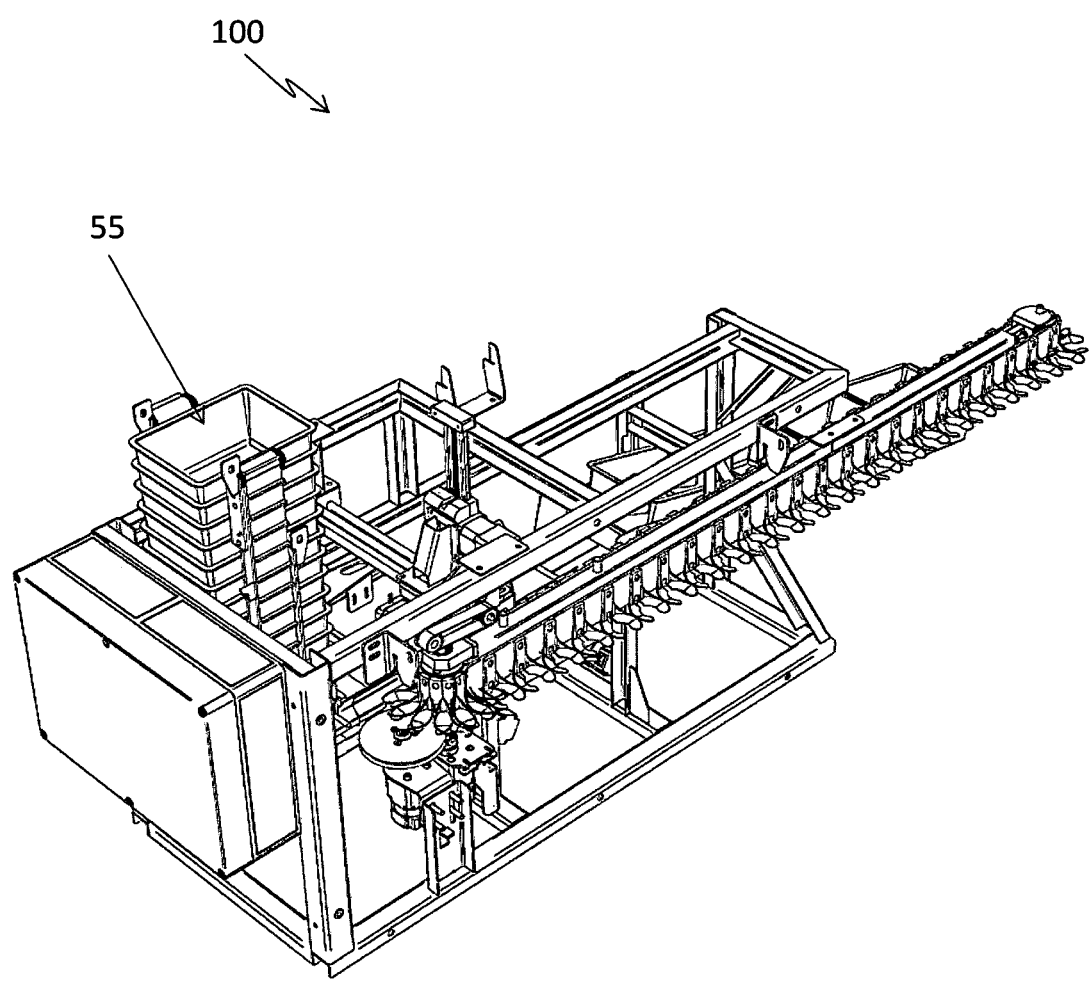
FIG. 14 is a rear perspective view of the mushroom packaging system of FIG. 12 showing a second longitudinal side of the system.
Figure 15:
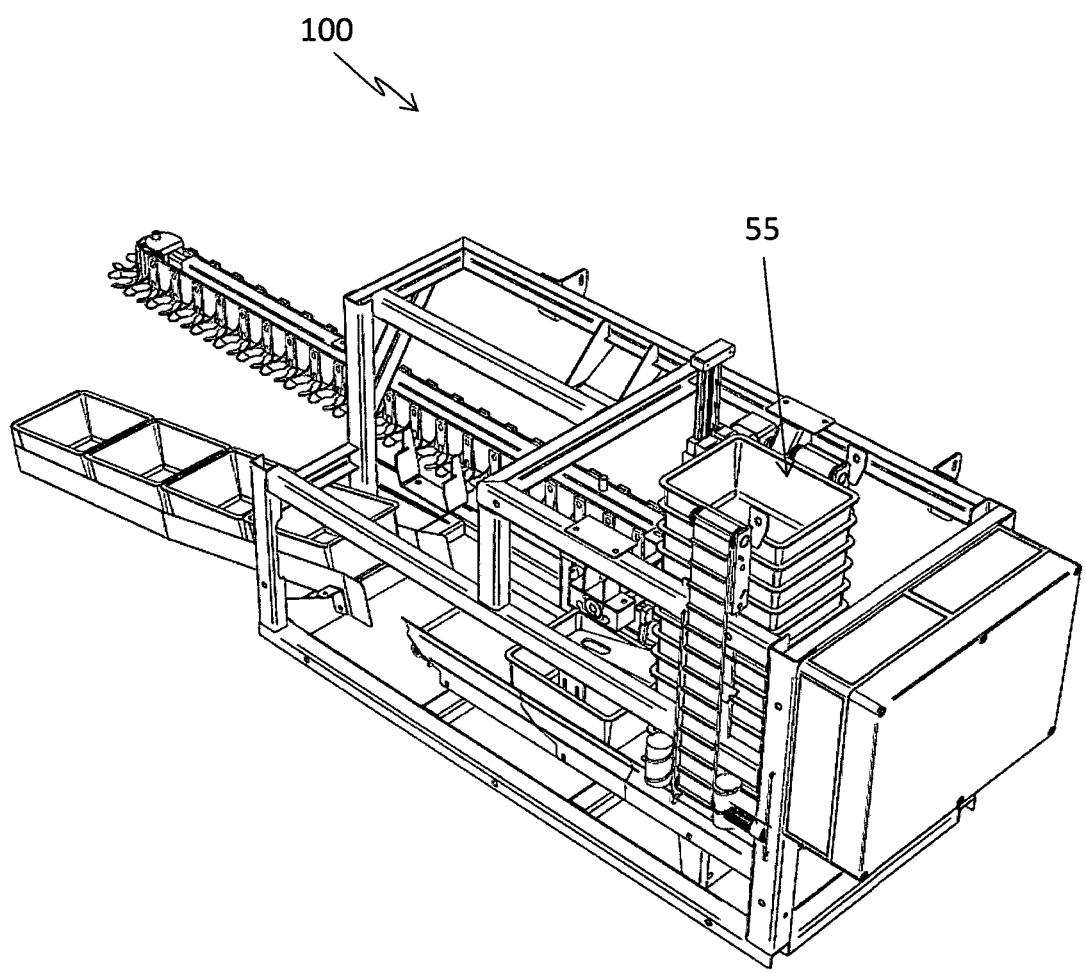
FIG. 15 is a rear perspective view of the mushroom packaging system of FIG. 12 showing a first longitudinal side of the system.

The system 10 is locatable adjacent a source of mushrooms 13 from which an operator may pick or otherwise harvest mushrooms 13. The source is typically a growth bed from which an operator may pick mushrooms. The system 10 may be mounted on a lifting apparatus 47 by which it may be raised and lowered to align with mushroom growth beds at differing heights. It is typical in the mushroom growing industry to stack mushroom growth beds. In a preferred embodiment, as best illustrated in FIG. 11, the lifting apparatus 47 comprises a vertical frame 48, the system 10 being slidably mounted on the frame 48 via mounting components 51, and further comprising motor(s), hydraulic ram(s), or other such suitable drive means in operable engagement therebetween to drive slidable movement of the system 10 along the frame 48 in both vertical directions. The ability to raise the system 10 to align with growth beds further reduces the requirement for an operator to move to access growth beds of differing heights. The frame 48 may also be movable such that it, and accordingly the remainder of the system, may be easily moved to other sections of growth beds if required.

In a preferred embodiment, the controller 53 may be in operable communication with any one or more of the mushroom conveyor 16, components of the mushroom packaging apparatus 11, the release mechanism of the container storage apparatus 50, the conveyor 22, the lifting apparatus 47, and/or with drive means of these various components, as required, in order to control the operation of the system 10. Sensors (not shown) may be placed so as to determine positioning, speed, weight, or any other such useful system parameter such that the controller 53 may coordinate the actions of the various system components to control the packaging process accordingly. Such methods of control are generally known to the person skilled in the art. In some embodiments, the controller 53 is in operable communication with a storage module configured to store data in relation to the packaging operation carried out by the system, such data may be utilised to analyse the efficiency of the operation. Various sensors may be provided to detect jamming of mushrooms or of containers, positioning of the mushroom conveyor 16, and the positioning of mushrooms themselves on the mushroom conveyor 16. Such sensors are in operable communication with the controller 53 such that the controller 53 may utilise the output thereof to control the system. The system may also be configured to run on a 12V battery which provides a running time of up to 5 hours.

In an alternative embodiment of the mushroom packaging system 100, as is best illustrated in FIGS. 12 to 19, the container storage apparatus 50 comprises a container storage portion 55 located to the rear of the mushroom packaging apparatus 11, i.e. beyond the packaging apparatus 11 with respect to the operator station 20. A container 12 may therefore be deposited from the container storage portion onto the conveyor 22 at a first side of the mushroom packaging apparatus 11. The first side of the mushroom packaging apparatus 11 is the side locatable distal the side thereof closest the packaged mushroom collection station 18. In this embodiment, the conveyor 22 conveys an empty container 12 deposited thereon through the mushroom packaging apparatus 11, stopping at the loading location 30 whereupon it is filled with mushrooms, and then towards the packaged mushroom collection station 18.

Figure 16:
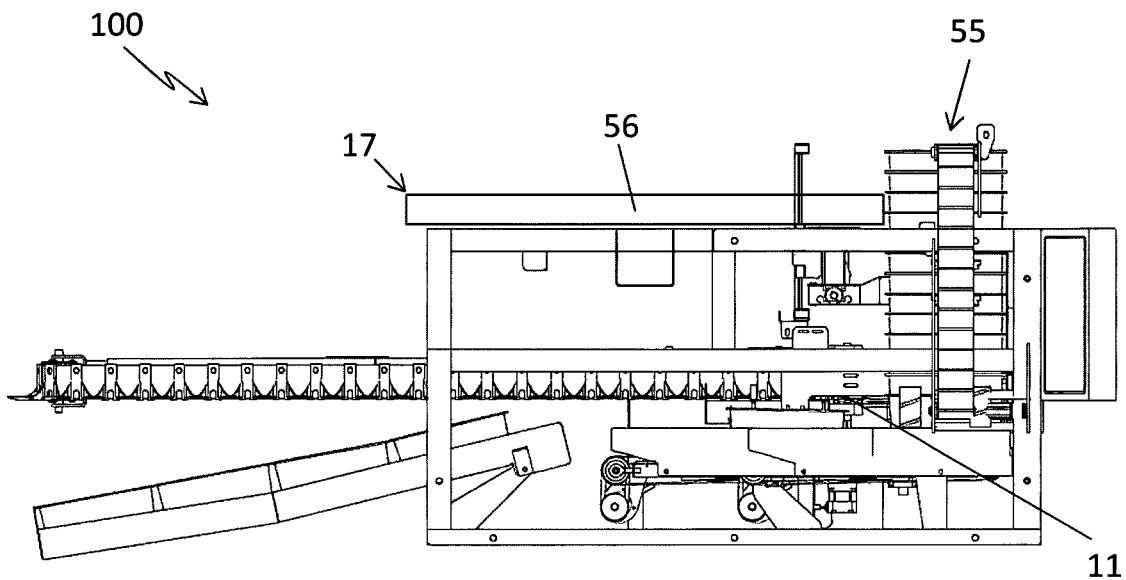
FIG. 16 is a side view of the mushroom packaging system of FIG. 12 showing a first longitudinal side of the system.
Figure 17:
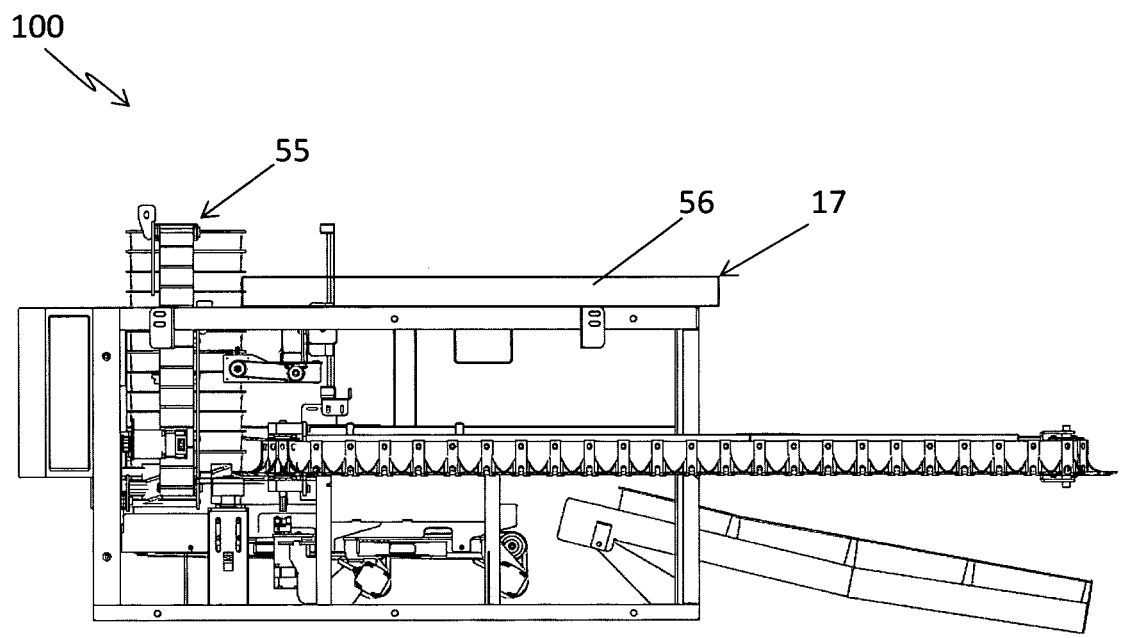
FIG. 17 is a side view the mushroom packaging system of FIG. 12 showing a second longitudinal side of the system.
Figure 18:
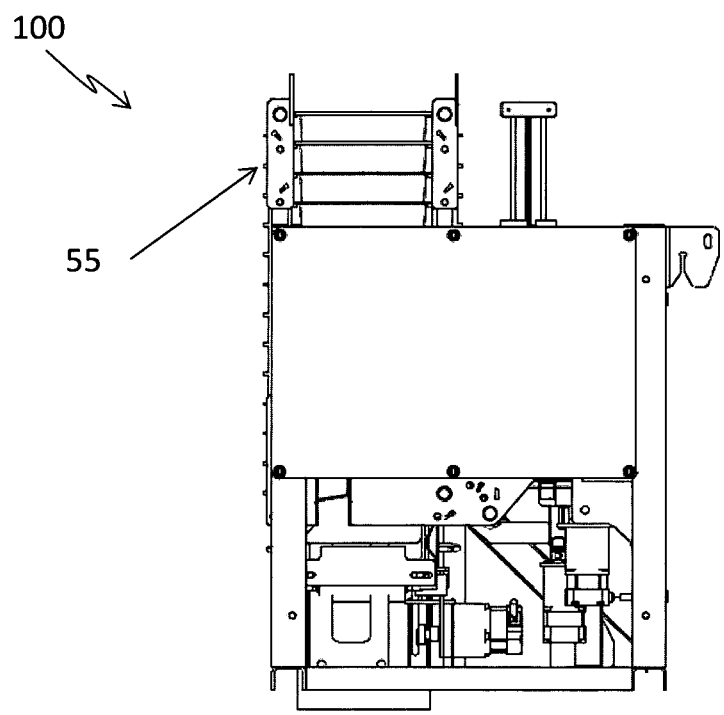
FIG. 18 is a rear view of the mushroom packaging system of FIG. 12.
Figure 19:
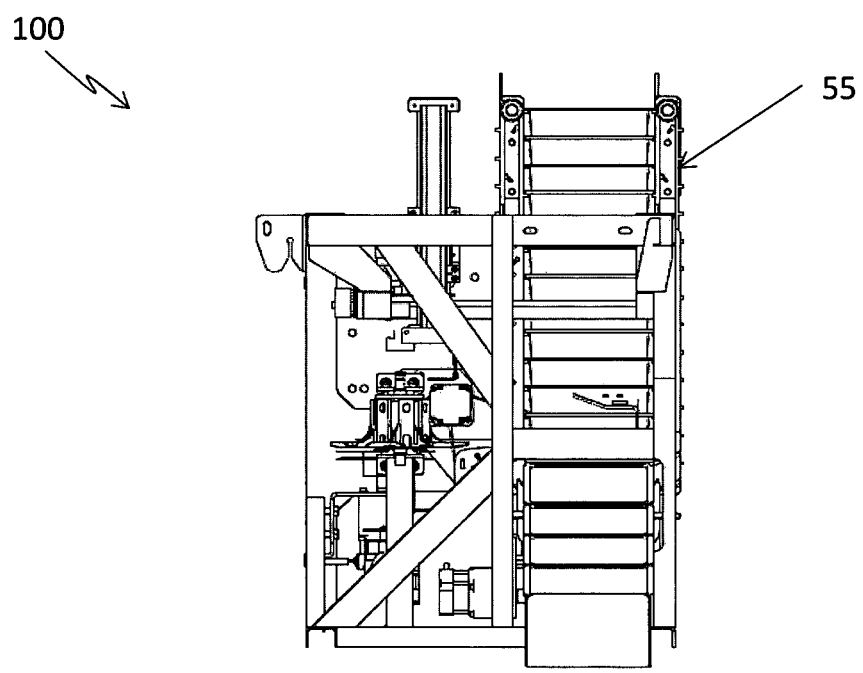
FIG. 19 is a front view of the mushroom packaging system of FIG. 12.

The container storage portion 55 may be located such that an operative cannot directly place containers thereinto. Resultantly a container transport device 56 is provided to transport containers between the container loading station 17 and the container storage portion 55, as can be seen in FIGS. 16 and 17. The container transport device 56 may comprise a conveyor, chute, slide, or any other suitable mechanism. The transport device 56 ideally permits a carton containing a plurality of containers to be transported to, and located into, the container storage portion 55. The positioning of the container storage portion 55 at the first side of the mushroom packaging apparatus 11 allows a container placed thereon to move in a single direction on the conveyor belt 22 and facilitates the placement of a container on the conveyor belt 22 and transfer of said placed container to the mushroom packaging apparatus 11 without waiting for a previously placed container to clear the area beneath the container storage portion 55, as would be the case in the embodiment of FIGS. 1 to 11. The conveyor belt 22, in this embodiment, travels in a single direction from beneath the container storage portion 55 to the packaged mushroom collection station 18.

Figure 20:
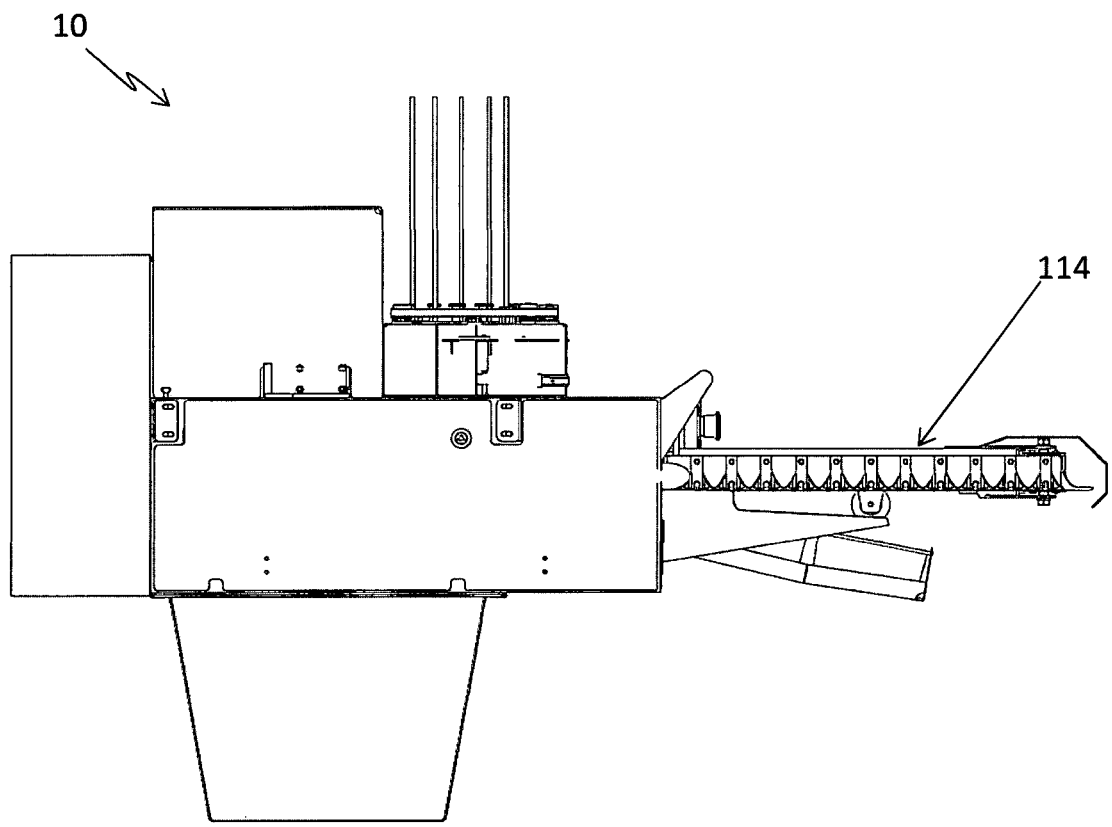
FIG. 20 is a side view of a mushroom packaging system having a removably attachable mushroom loading apparatus.
Figure 21:
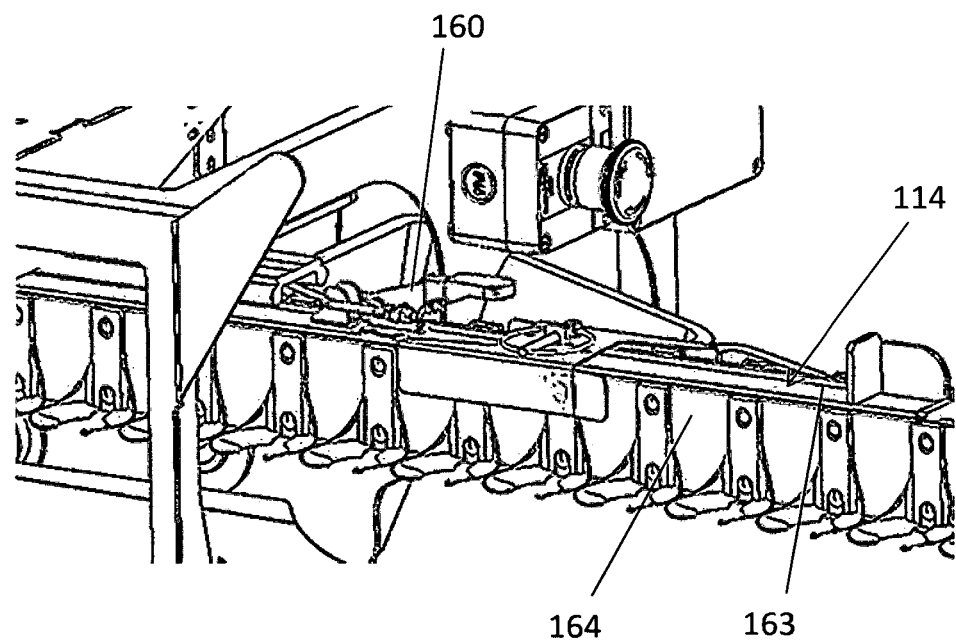
FIG. 21 is a detail perspective view of a removably attachable mushroom loading apparatus for a mushroom packaging system.
Figure 22:
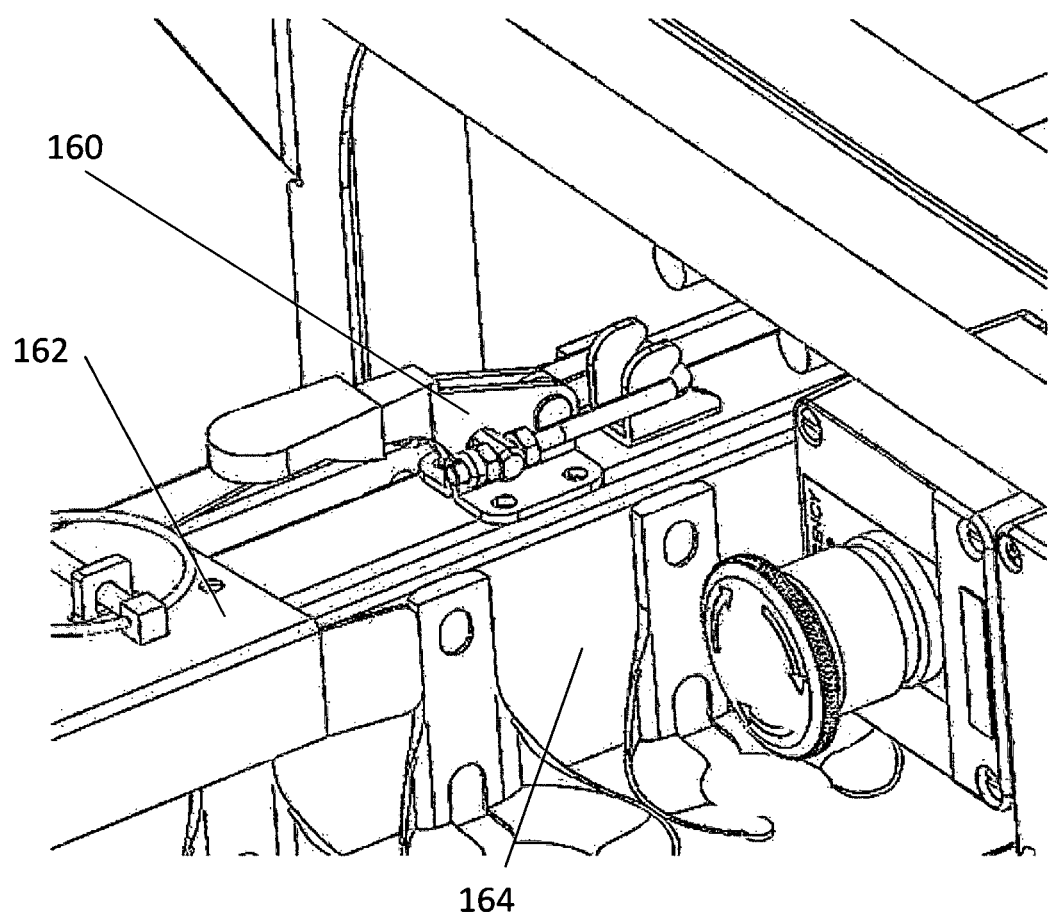
FIG. 22 is a detail perspective view of a loading apparatus coupling mechanism of a removably attachable mushroom loading apparatus for a mushroom packaging system.

In some embodiments, as is best viewed in FIGS. 20 to 22, the mushroom loading apparatus 114 is removably attachable to the remainder of the mushroom packaging system 10 via a loading apparatus coupling mechanism 160. In a preferred embodiment the loading apparatus coupling mechanism 160 is a quick release coupling mechanism. The quick release coupling mechanism 160 can be any such mechanism which would be readily known to the skilled person, such as a lever operated coupling mechanism 160 which may be both released and recoupled without the need for tools or specialised knowledge. Advantageously, a first mushroom loading apparatus 114 sized and dimensioned to accommodate mushrooms of a first size may be quickly detached from the remainder of the mushroom packaging system 10 by releasing the lever operated coupling mechanism 160 and quickly replaced with an alternative mushroom loading apparatus sized and dimensioned to accommodate mushrooms of a size different from said first size. In this way an operator may quickly adapt the mushroom packaging system 10 to package mushrooms of varying sizes. This is particularly relevant where picking mushrooms on raised beds as an operator at an upper bed may adapt the machine to package a different type of mushroom having a different size without returning to floor level. In an exemplary embodiment, the mushroom packaging system 10 may be provided with three interchangeable mushroom loading apparatus 114, one which is sized and dimensioned to accommodate button mushrooms having a diameter of approximately 20 mm-40 mm, one which is sized and dimensioned to accommodate midsize mushrooms of diameter of 40 mm-50 mm, and one which is sized and dimensioned to accommodate larger mushrooms of diameter between 50 mm and 80 mm. In this manner an operative can easily and quickly switch between packaging of these three types of mushroom. It should be understood that any number of interchangeable mushroom loading apparatus 114 may be provided as required. The interchangeable mushroom loading apparatus 114 may differ at least in the size of the mushroom holders 38 thereof, or in the spacing of said holders 38 to accommodate different sized mushrooms. The removably attachable mushroom loading apparatus 114 comprise rollers at either end to tension a belt 164 and hold said belt 164 in position. The rollers also comprise a groove sized and dimensioned for a positioning a guide rib of the belt thereinto. One of the rollers is a drive roller which is driven by a motor or the like to rotate and cause movement of the belt 164 and resultantly of the other roller. A Slide arrangement 162 is provided to guide the removably attachable mushroom loading apparatus 114 into position such that it may be secured by activation of the lever operated coupling mechanism 160. In a preferable arrangement, a drive cog arrangement is provided which connects the driven roller to a motor cog and motor, said cog and motor remaining on the remainder of the mushroom packaging system when the removably attachable mushroom loading apparatus 114 is removed. A main arm 163 of the removably attachable mushroom loading apparatus 114 may comprise a tensioning arrangement for shortening/lengthening said arm according to the belt 164 length. Additional Guides and rollers may also be provided to hold the belt 164 in place.

Figure 23:
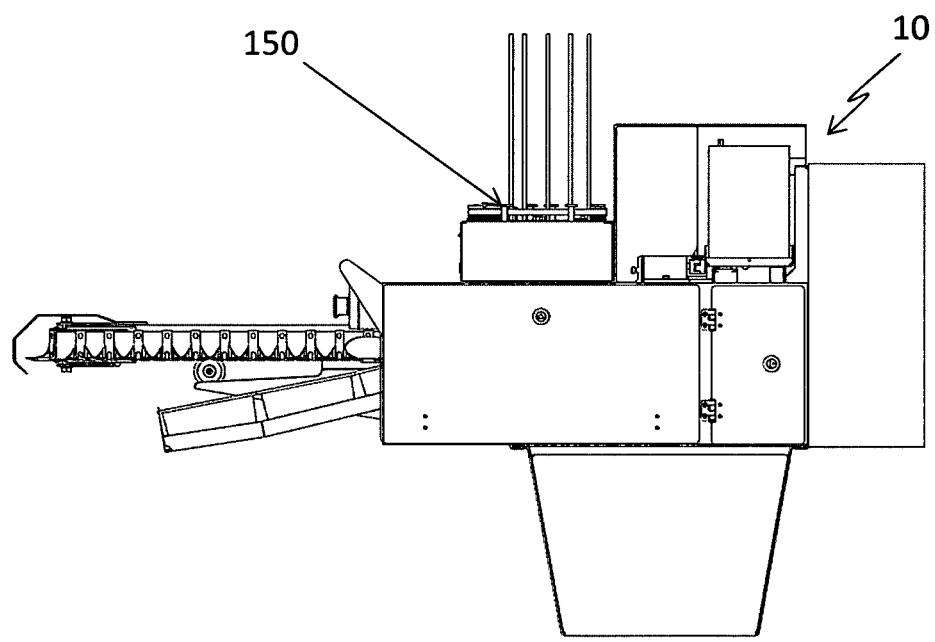
FIG. 23 is a side view of a mushroom packaging system having a removably attachable container storage apparatus.
Figure 24:
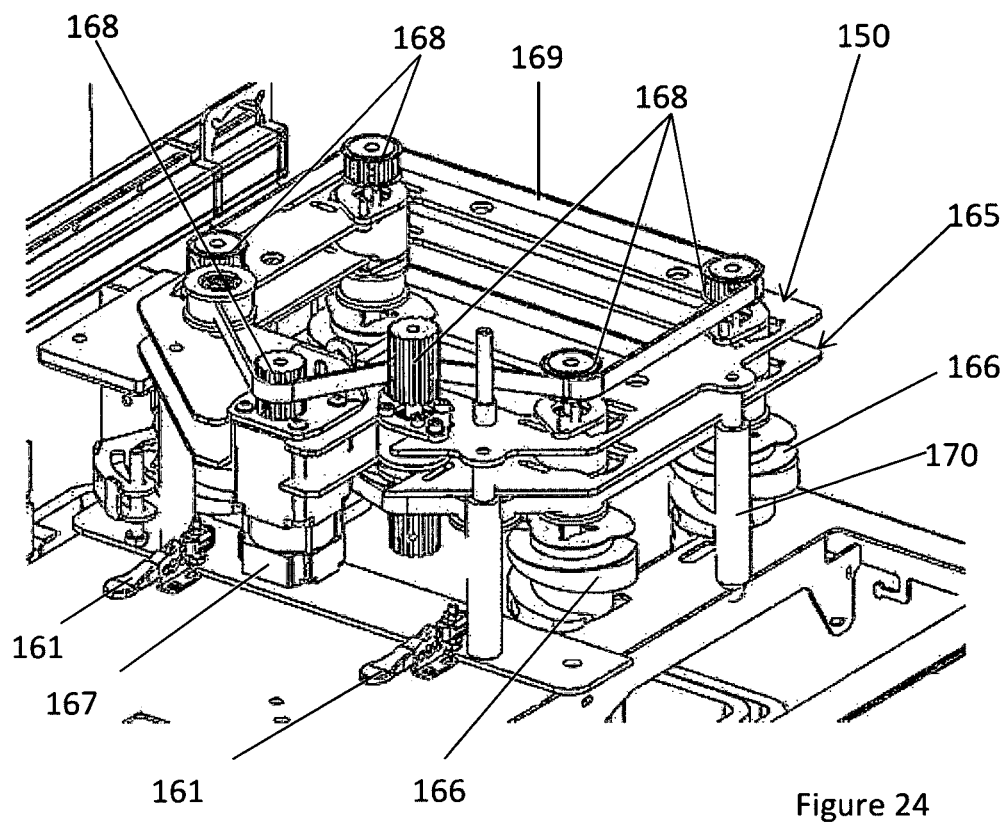
FIG. 24 is a detail perspective view of a removably attachable container storage apparatus mounted on a mushroom packaging system.
Figure 25:
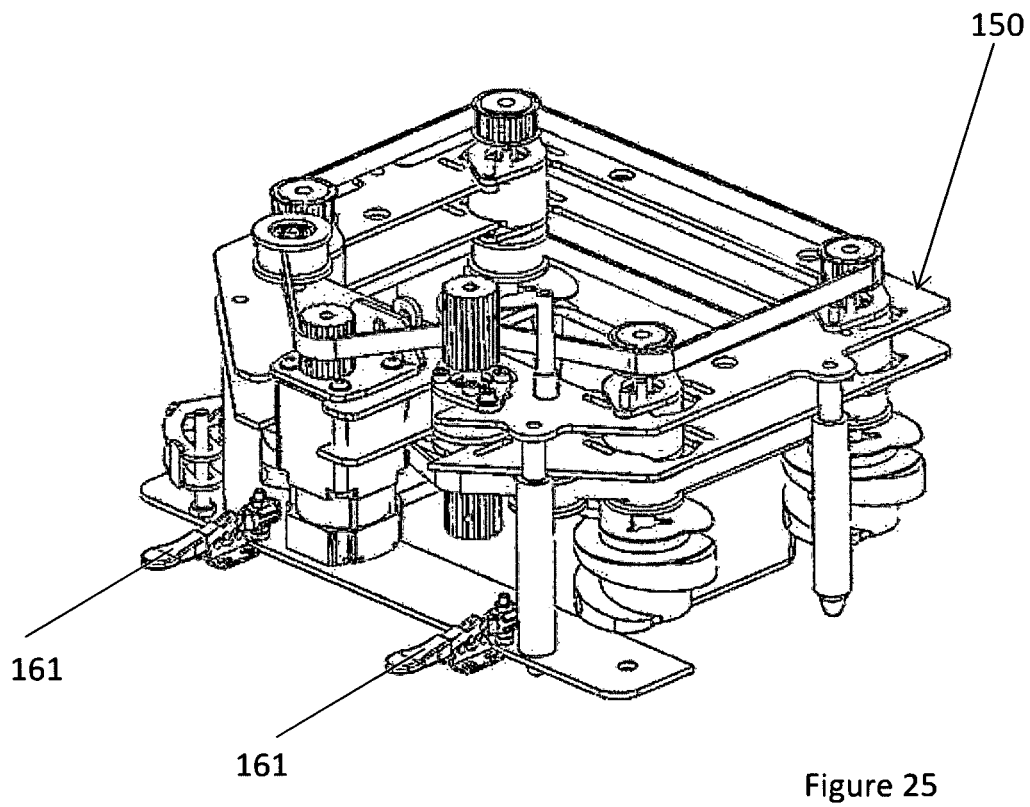
FIG. 25 is a perspective view of a removably attachable container storage apparatus for a mushroom packaging system.

As is best viewed in FIGS. 23 to 25, the container storage apparatus 150 may also be removably attachable to the remainder of the mushroom packaging system 10 via a container storage apparatus coupling mechanism 161. The container storage apparatus coupling mechanism 161 may also be a quick release coupling mechanism 161, and preferably is lever operated in a similar manner to the lever operated coupling mechanism 160 of the mushroom loading apparatus 114. In a most preferred embodiment there are two quick release coupling mechanisms 161 which couple the container storage apparatus 150 to the remainder of the mushroom packaging system 10. Advantageously, a first container storage apparatus 150 sized and dimensioned to accommodate containers of a first size and/or shape may be quickly detached from the remainder of the mushroom packaging system 10 and quickly replaced with an alternative container storage apparatus sized and dimensioned to accommodate containers of different from the first size and/or shape. In this way an operator may quickly adapt a mushroom packaging system 10 to package mushrooms into containers of varying sizes. The removably attachable container storage apparatus comprises a main body section 165 of with screws 166, a motor 167, cogs 168, belts 169, belt tensioning apparatus, and frame 170. A slide arrangement may also be provided to guide the container storage apparatus 150 into position. A detachable bracket may also be fixed to the container storage apparatus 150, the bracket comprising a female electrical connection, and a similar detachable bracket is likewise provided with a male electrical connection.

Figure 26:
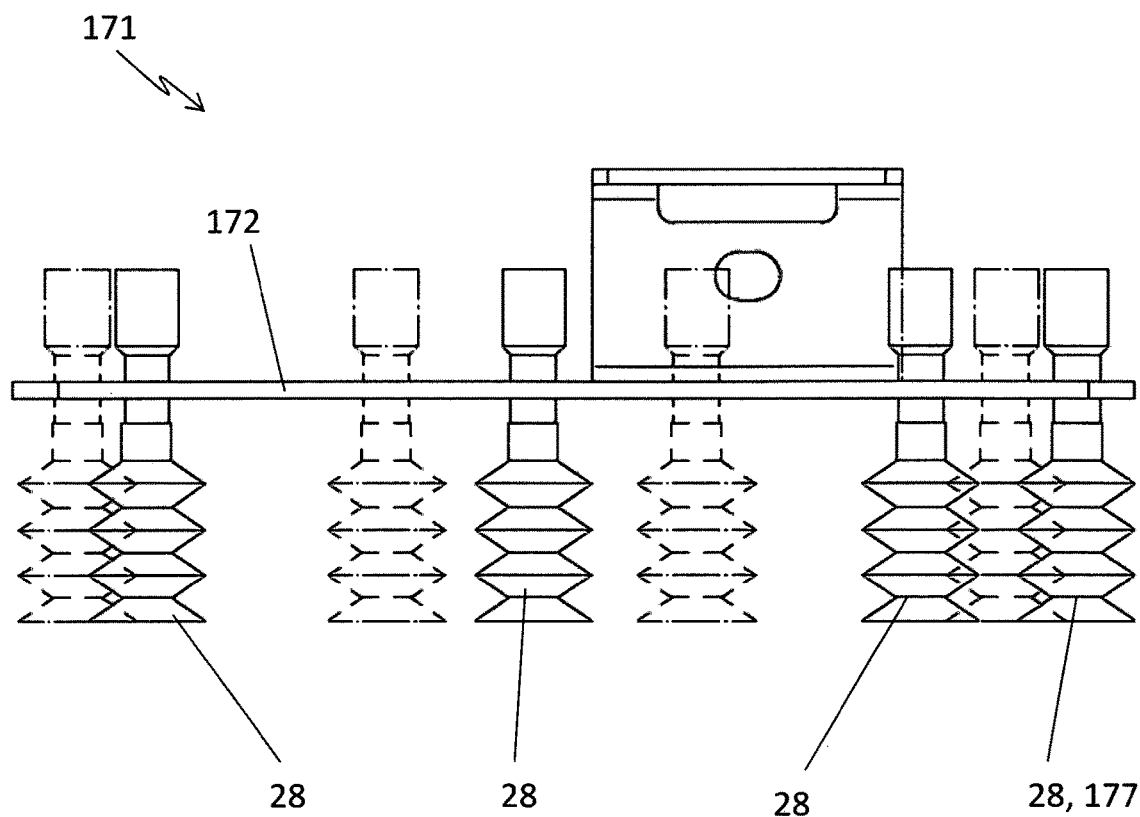
FIG. 26 is a side view of a mushroom lifting and/or lowering apparatus for a mushroom packaging apparatus.
Figure 27:
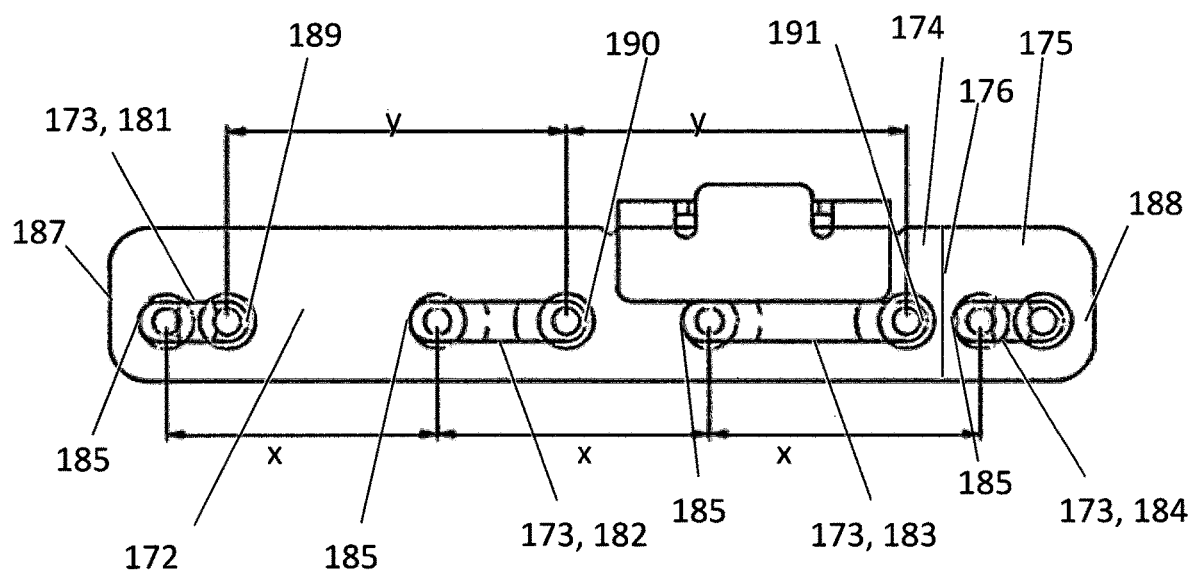
FIG. 27 is a top view of the mushroom lifting and/or lowering apparatus of FIG. 26.

As can be seen in FIGS. 26 and 27, the mushroom packaging apparatus may comprise a mushroom lifting and/or lowering apparatus 171 which comprises a plurality of lifting and lowering members 28 movably mountable on a base plate element 172 such that individual lifting and lowering members 28 may be movably positionable relative to each other. The lifting and lowering members 28 are slidably mountable within slots 173 formed in the base plate element 172. Advantageously, the mushroom lifting and lowering members 28 are individually movable relative to each other such that they may form an overall arrangement which is suited to a particular size of mushroom, or to a desired format for loading of containers 15. In some embodiments, the base plate element 172 comprises first and second portions 174, 175 joined about a pivotal coupling 176. The pivotal coupling may be a hinged coupling 176 or any other such suitable coupling as would be known by the skilled person. Advantageously, the second portion 175 of the base plate element 172 may be rotated upwards to an out of use position when the lifting and lowering members 177 mountable thereon are not required to form a desired arrangement. In the preferred case the second portion 175 is rotated such to a position perpendicular to the first portion where it is retained by a retaining element such as a retaining catch. The mushroom lifting and/or lowering apparatus 171 may also be provided with a retaining plate for retaining the lifting and lowering members 28 in a desired position within their respective slots 173. It should also be understood that one or more of the lifting and lowering members 28 may be removed from their respective slots to further still adapt the overall arrangement of the lifting and lowering members 28 provided on the base plate element 172. In a preferred embodiment, the base plate element 172 comprises four slots 181, 182, 183, 184, first and second end slots 181, 184 are locatable towards each end 187, 188 of the base plate element 172, and first and second central slots 182, 183 are locatable therebetween. The slots 181, 182, 183, 184, are arranged in a linear arrangement. Preferably, first ends 185 of each slot 181, 182, 183, 184 are located approximately 40 mm from each adjacent slot. Also preferably, the second end 189 of the first end slot 181 is locatable 50 mm from the second end 190 of the first middle slot 182. The second end 190 of the first middle slot 183 is locatable 50 mm from the second end 191 of the second middle slot 183. As is best seen in FIG. 27 this permits arrangements wherein four lifting and lowering members 28 may be utilised in a linear arrangement where each is paced apart by 40 mm (see spacing indicated as 'x' at the bottom portion of FIG. 27), or arrangements where three lifting and lowering members 28 may be utilised in a linear arrangement where each is paced apart by 50 mm (see spacing indicated as 'y' on the top portion of FIG. 27). This facilitates use with mushrooms of differing diameters as described above. In arrangements where three lifting and lowering members 28 are utilised, the unused lifting and lowering member 28, 177 of the second end slot 184 may be removed from its slot 184, or the second portion 175 of the base plate element 172 may be rotated to the out of use position as described above. The second end slot 184 may also extend to the second end 188 of the base plate element to form an open ended slot having an opening on at the second end 188 of the base plate element. The unused lifting and lowering member 28, 177 may in this case be simply slid out of said open end of the slot when not required. The In a preferred arrangement, the first end slot has a length of approximately 10 mm, the first middle slot 182 has a length of approximately 20 mm, the second middle slot 183 has a length of approximately 30 mm, and the second end slot 184 has a length of approximately 10 mm.

Figure 28:
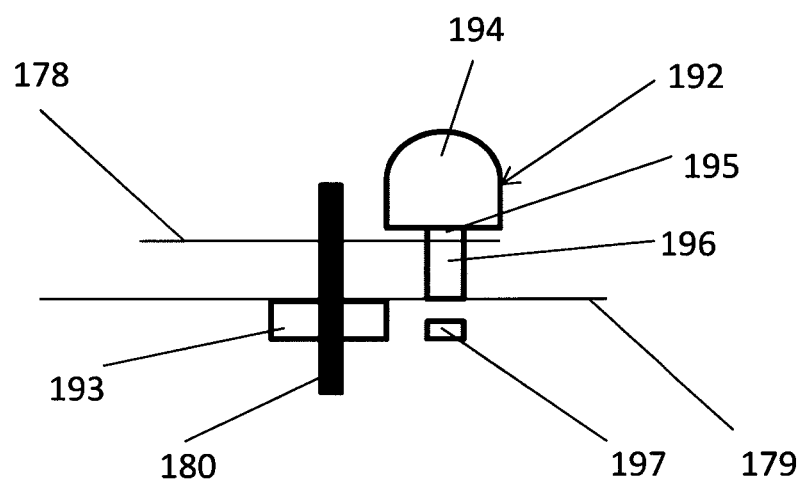
FIG. 28 is a side view of a mushroom processing apparatus for a mushroom packaging system comprising two blades.

As can be seen in FIG. 28, the mushroom processing apparatus 25 may comprises first and second rotatable blades 178, 179 mountable on a common axis, the first blade 178 being an upper blade and the second blade 179 being a lower blade. The common axis is formed by a rotatable shaft 180. The lower blade 179 preferably has a greater diameter then the upper blade 178 such that a mushroom 192 approaching the blades 178, 179 laterally will contact the lower blade 179 before the upper blade 178. The lower blade 179 is movable along said rotatable shaft 180 to increase or decrease the distance between the blades 178, 179. The lower blade 179 is selectably securable to the rotatable shaft 180 at a desired location by a locking element 193. Generally, the upper and lower blades 178, 179 are positioned such that a mushroom head 194 is locatable above the upper blade 178 during the cutting process whilst the lower blade 179 is positioned such that it may cut the stalk of the mushroom at a position below the cut made by the upper blade 178. Advantageously, the stalk of a mushroom may cut at two selectable locations such that the upper the portion of mushroom above the upper blade 178 comprises a mushroom head 194 and a pre-determined length of stalk 195, the portion of mushroom 196 cut between the upper and lower blades 178, 179 comprises a length of stalk 196 suitable for use as an ingredient for soup or the like, and the portion of stalk 197 cut below the lower blade 179 is a waste portion 197.

In use, the preferred system 10, 100 is utilised in a method of packaging mushrooms 13 comprising the step of first loading mushrooms 13 onto a mushroom conveyor 16 at a mushroom loading station 15 and loading empty containers 12 into an empty container storage apparatus 50. The method further comprising transferring the loaded mushrooms and empty containers 12 to a mushroom packaging apparatus 11 whereat the mushrooms 13 are placed into the empty containers 12 forming a items of packaged mushrooms. The items of packaged mushrooms are then transferred to a packaged mushroom collection station 18 whereat they are collected. The loading and collecting operations of the method are carried out by an operator located at one operator station 20.

The system, due to the layout of the components as described above, forms a low profile such that it is easily transportable when compared to existing systems. Moreover, the system is more easily manipulated onsite, and more easily stored due to its compact form.

The invention is not limited to the embodiment(s) described herein but can be amended or modified without departing from the scope of the present invention.

The invention claimed is:

1. A mushroom packaging system comprising:
a mushroom packaging apparatus for packing mushrooms into containers;
a mushroom loading apparatus comprising a mushroom loading station and a mushroom conveyor for conveying mushrooms to the mushroom packaging apparatus;
a container conveyance apparatus for conveying containers from a container storage apparatus to a packaged mushroom collection station via the mushroom packaging apparatus;
the container storage apparatus comprising a container loading station and being operable to deliver containers onto said container conveyance apparatus; and
wherein the mushroom loading station, container loading station and packaged mushroom collection station are located such that a human operator located at an operator station is able to load mushrooms to the mushroom loading station, load containers to the container loading station, and retrieve containers from the packaged mushroom collection station, wherein the mushroom packaging apparatus comprises at least one mushroom lifting and/or lowering means which lifts the mushrooms from the mushroom conveyor and transfers the mushrooms to a container locatable on the container conveyance apparatus, and wherein the at least one mushroom lifting and/or lowering means comprises at least one suction cup configured to engage with and selectable retain the mushrooms.

2. The mushroom packaging system of claim 1, wherein the operator station is positioned at a first end of the mushroom packaging system, the mushroom loading station, container loading station, and packaged mushroom collection station being positioned relative to the operator station such that they are accessible by an operator from the first end of the system.

3. The mushroom packaging system of claim 1, wherein the mushroom conveyor and the container conveyance apparatus are configured such that mushrooms travel in a U-shaped path from the mushroom loading station to the packaged mushroom collection station, and wherein the mushroom loading station and packaged mushroom collection station are located adjacent each other and the operator station.

4. The mushroom packaging system of claim 1, wherein the container conveyance apparatus is configured to selectably convey the containers both in a first direction towards the mushroom packaging apparatus and in a second direction towards the packaged mushroom collection station, and wherein the first and second directions are opposite to each other.

5. The mushroom packaging system of claim 4, wherein the container storage apparatus is located such that a container stored therein may be deposited therefrom onto the container conveyance apparatus at a location between the mushroom packaging apparatus and the packaged mushroom collection station, and wherein the container conveyance apparatus is arranged to convey an empty container deposited thereon in the first direction to the mushroom packaging apparatus, whereupon the empty container is at least partially filled, before moving the at least partially filled container in a second direction from the mushroom packaging apparatus to the packaged mushroom collection station.

6. The mushroom packaging system of claim 1, wherein the container storage apparatus comprises a container storage portion located such that a container may be deposited therefrom onto the container conveyance apparatus at a first side of the mushroom packaging apparatus located distal the side thereof closest the packaged mushroom collection station, and the container conveyance apparatus is arranged to convey an empty container deposited thereon through the mushroom packaging apparatus and towards the packaged mushroom collection station.

7. The mushroom packaging system of claim 6, wherein the mushroom processing apparatus comprises first and second rotatable blades mountable on a common axis, the first blade being an upper blade and the second blade being a lower blade, and at least one of said first or second blades is movable along said common axis to increase or decrease the distance between the first and second blades.

8. The mushroom packaging apparatus of claim 1, wherein a container transport device is provided to transport containers between the container loading station and the container storage portion.

9. The mushroom packaging system of claim 1, further comprising a mushroom processing apparatus located between the mushroom loading station and the mushroom packaging apparatus, the mushroom processing apparatus being configured to carry out a processing step on the mushrooms, the mushroom processing apparatus comprising a blade and the mushroom processing step is a cutting or trimming operation.

10. The mushroom packaging system of claim 1, wherein the packaging apparatus comprises a slidable transfer carriage on which the at least one mushroom lifting and/or lowering means is mounted.

11. The mushroom packaging system of claim 10, wherein the mushroom conveyor comprises mushroom holders which retain the mushrooms at an orientation wherein the heads thereof are facing upwards.

12. The mushroom packaging system of claim 10, wherein the mushroom packaging apparatus comprises a mushroom lifting and/or lowering apparatus which comprises a plurality of mushroom lifting and/or lowering means movably mountable on a base plate element such that individual lifting and/or lowering means may be selectably positionable relative to each other.

13. The mushroom packaging system of claim 12, wherein the lifting and/or lowering means are slidably mountable within slots formed in the base plate element, or wherein the base plate element comprises first and second portions joined about a pivotal coupling.

14. The mushroom packaging system of claim 1, further mounted on a lifting apparatus for raising and lowering the system, the lifting apparatus comprises a generally vertical frame, the system being slidably mountable to the frame and further comprising drive means configured to drive slidable movement of the remainder of the system along the frame.

15. The mushroom packaging system of claim 1, wherein the mushroom packaging apparatus comprises a weighing apparatus configured to weigh a container located at the mushroom packaging apparatus.

16. The mushroom packaging system of claim 1, wherein the mushroom packaging apparatus further comprises a controller, the controller being in operable communication with the weighing apparatus such that container weight obtained from the weighing apparatus may be used by the controller to control the extent of filling of said container.

17. The mushroom packaging system of claim 1, wherein the mushroom loading apparatus is removably attachable to the remainder of the mushroom packaging system via a loading apparatus coupling mechanism, and wherein the loading apparatus coupling mechanism is a quick release coupling mechanism.

18. The mushroom packaging system of claim 1, wherein the container storage apparatus is removably attachable to the remainder of the mushroom packaging system via a container storage apparatus coupling mechanism, and wherein the container storage apparatus coupling mechanism is a quick release coupling mechanism.

19. A method of packaging mushroom, the method comprising the steps of:
    loading mushrooms onto a mushroom conveyor at a mushroom loading station;
    loading empty containers into an empty container storage apparatus;
    transferring the loaded mushrooms and empty containers to a mushroom packaging apparatus, wherein the mushroom packaging apparatus comprises at least one mushroom lifting and/or lowering means comprising at least one suction cup configured to engage with and selectable retain the mushrooms;
    using said at least one suction cup, placing the mushrooms into the empty containers at the mushroom packaging apparatus forming items of packaged mushrooms;
    transferring the packaged mushroom items to a packaged mushroom collection station; and
    collecting packaged mushroom items from the package mushroom collection station;
    wherein the loading and collecting operations are carried out by an operator located at one operator station.

\* \* \* \* \*